Figures 1, 2:
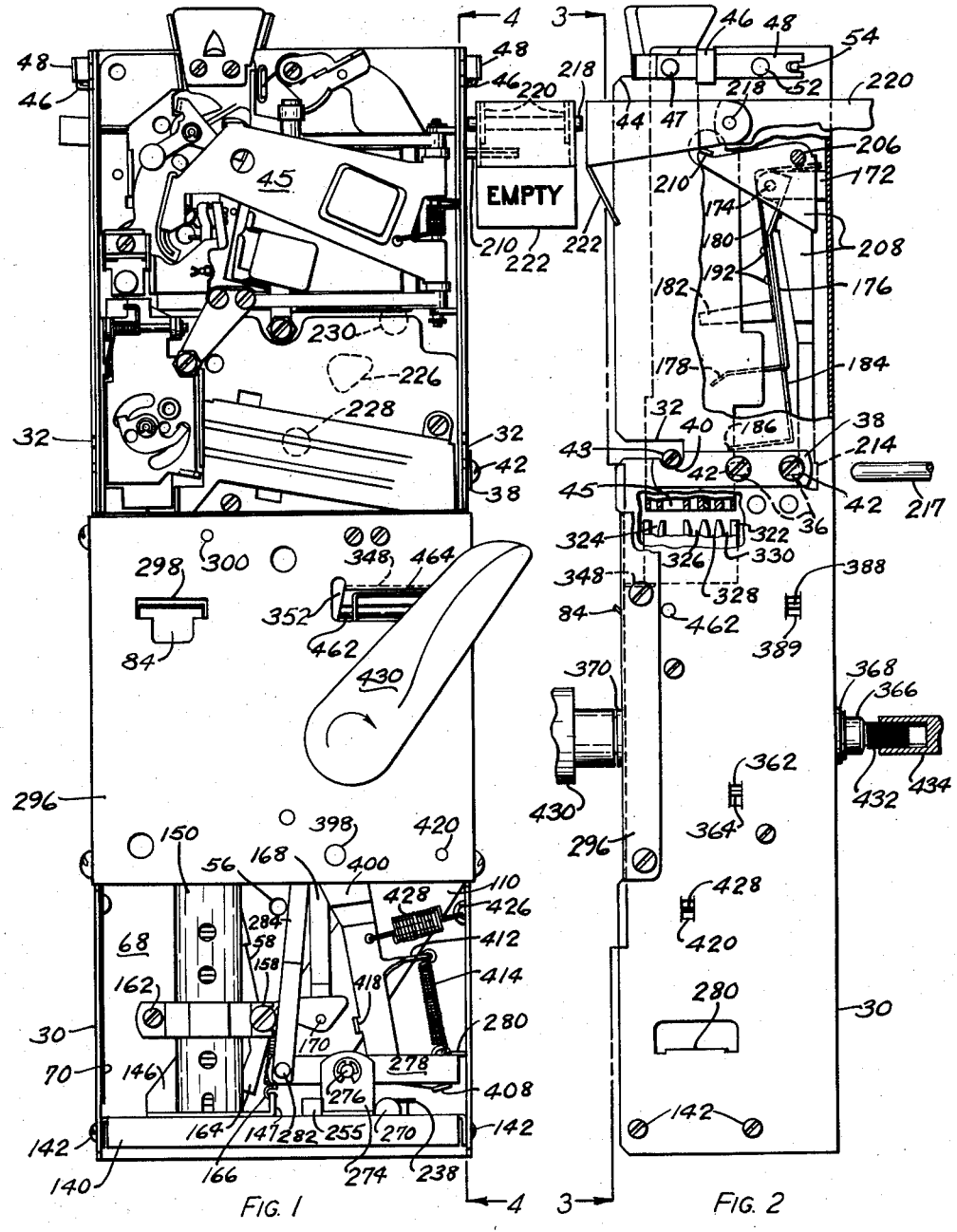

Aug. 11, 1959 G. F. ERICKSON 2,899,039
COIN SEPARATORS

Filed Jan. 27, 1954 7 Sheets-Sheet 1

INVENTOR.
GUSTAV F. ERICKSON
BY
Rey Eilers
ATTORNEY

Aug. 11, 1959

G. F. ERICKSON 2,899,039

COIN SEPARATORS

Filed Jan. 27, 1954

7 Sheets-Sheet 2

INVENTOR.
GUSTAV F. ERICKSON
BY

Rey Eilers

ATTORNEY

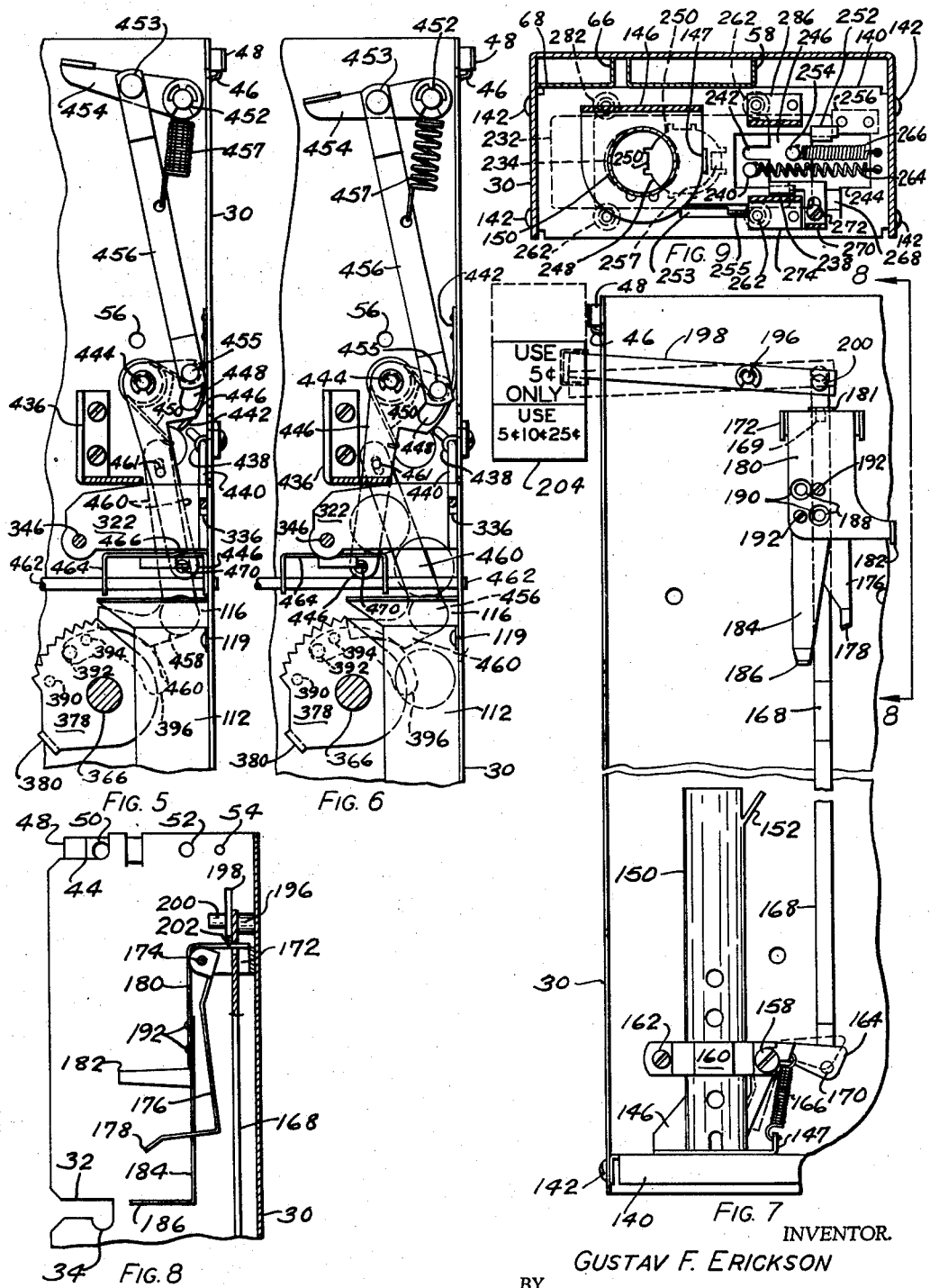

Aug. 11, 1959 G. F. ERICKSON 2,899,039
COIN SEPARATORS
Filed Jan. 27, 1954 7 Sheets-Sheet 4
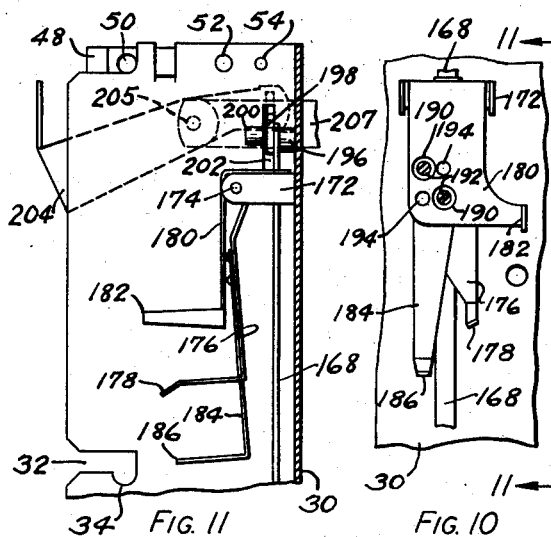
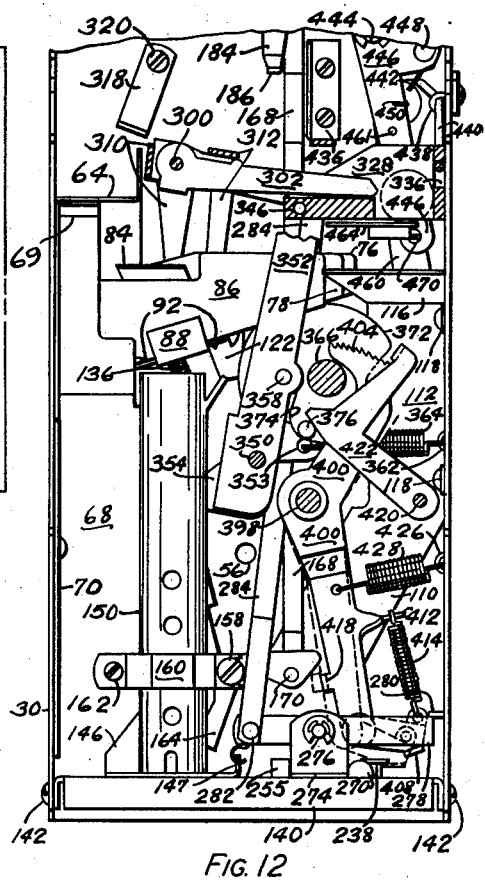
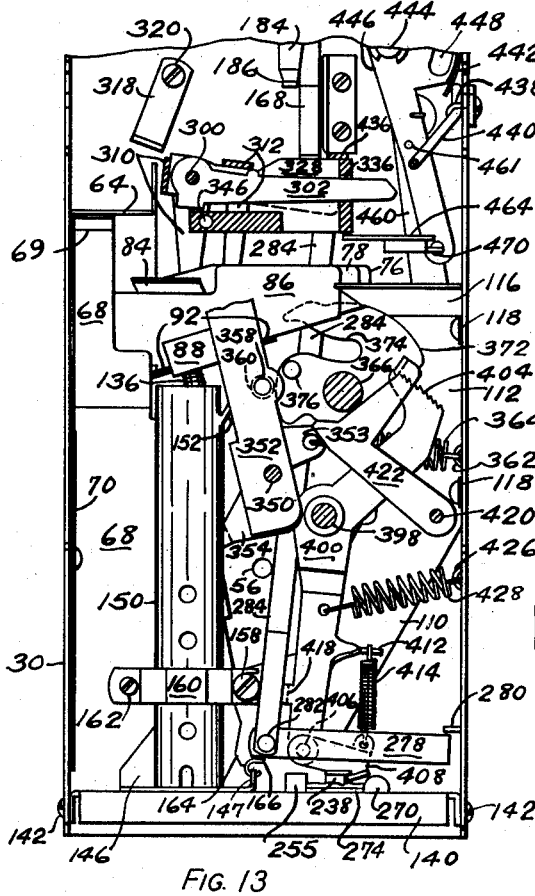
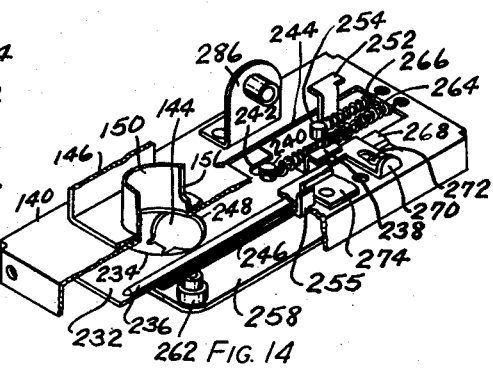
INVENTOR.
GUSTAV F. ERICKSON
BY
Rey Eilers
ATTORNEY

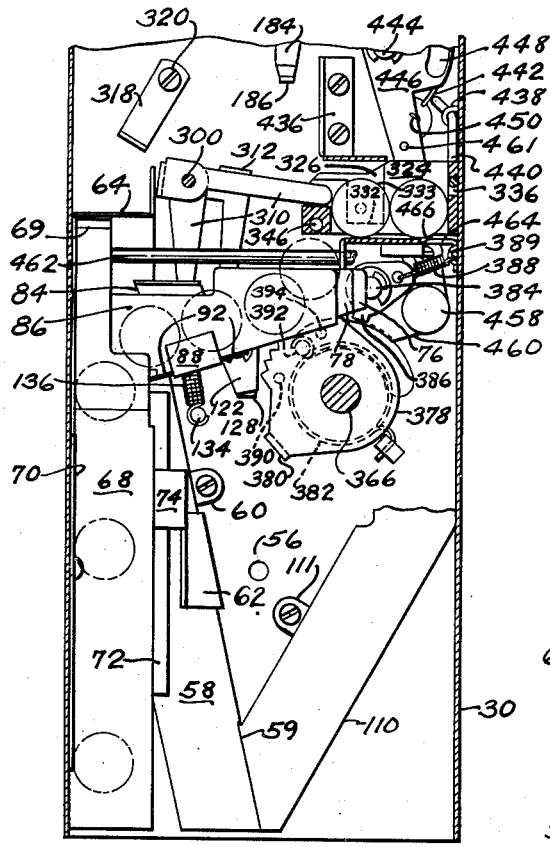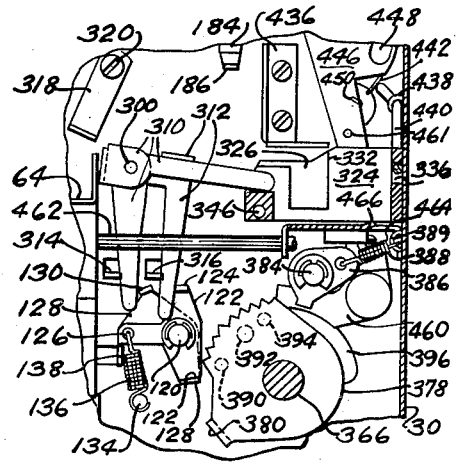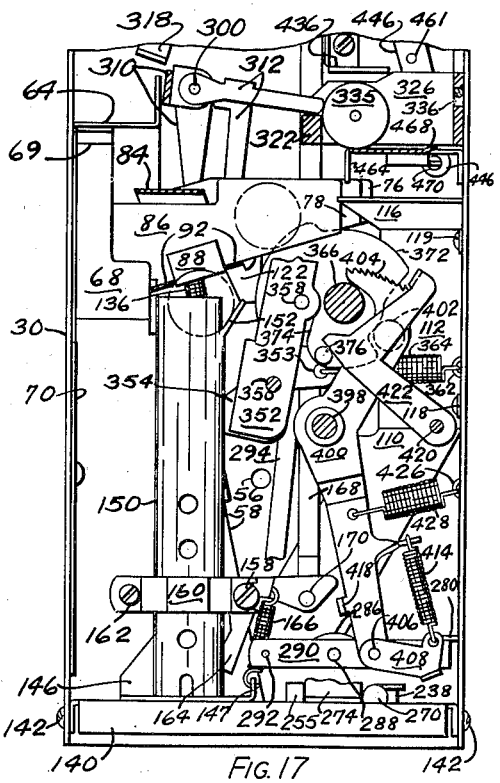

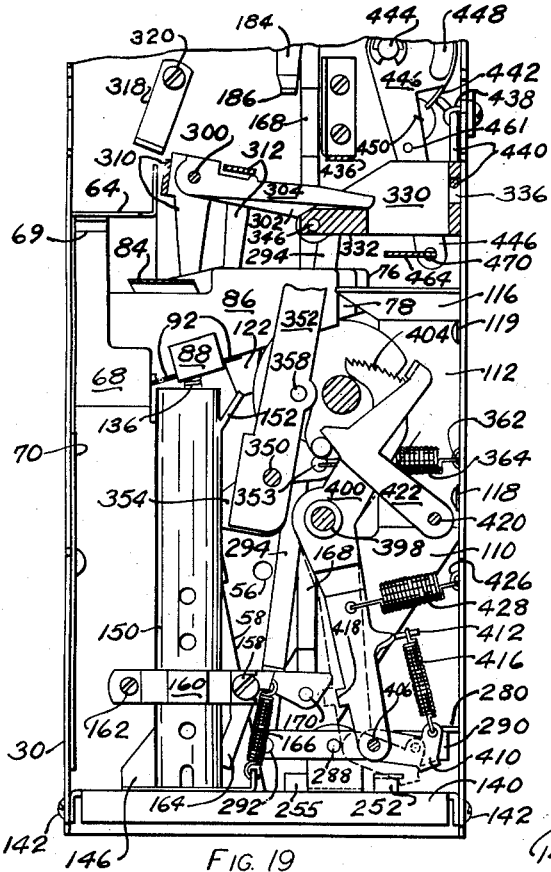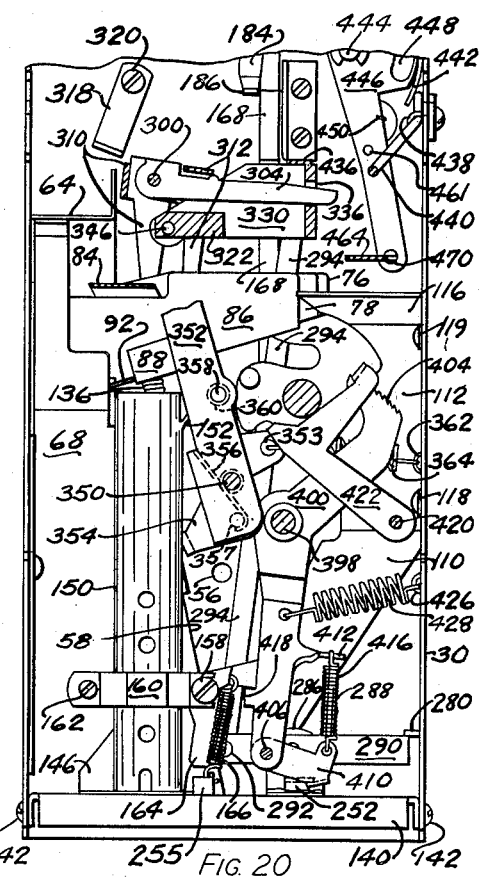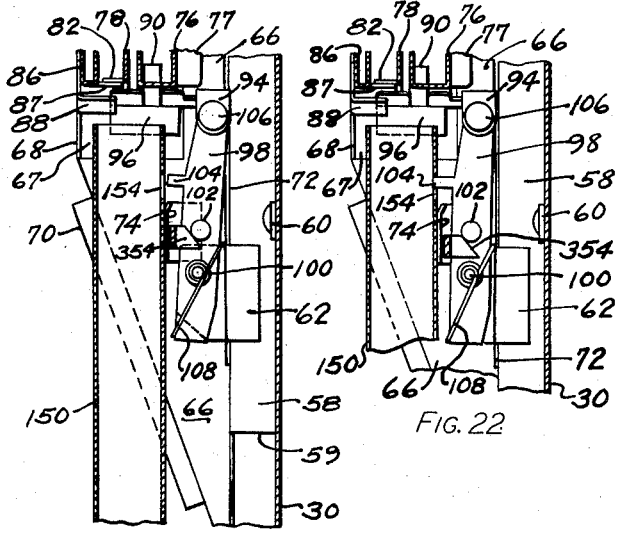

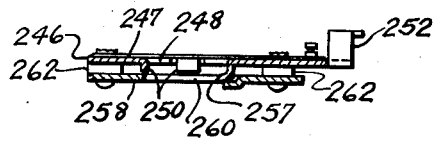
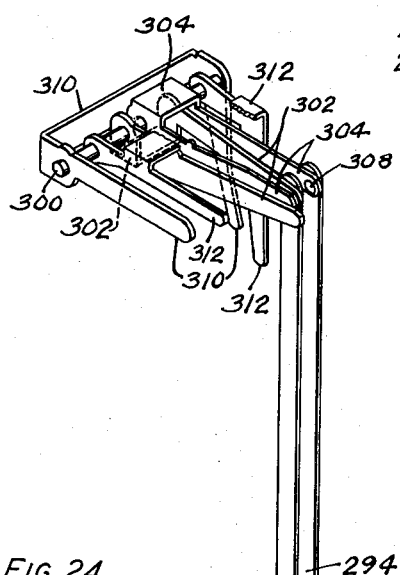
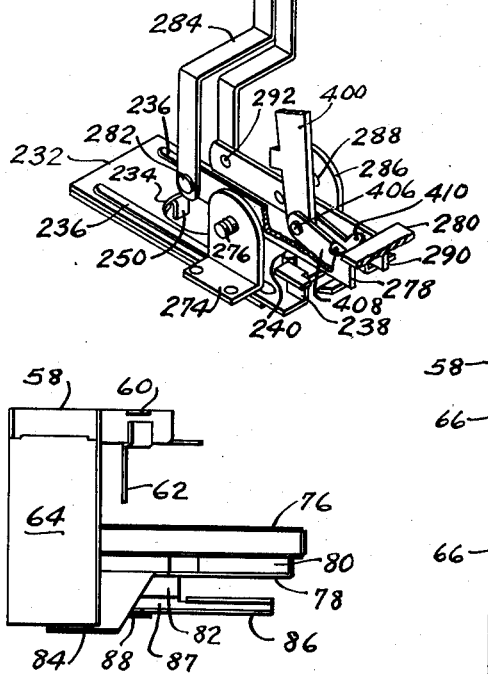
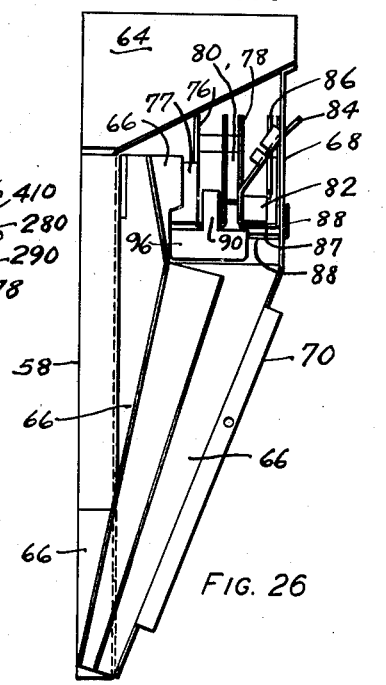
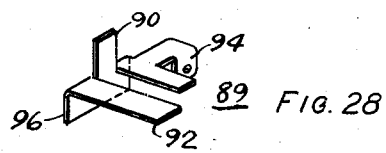
INVENTOR.
GUSTAV F. ERICKSON
BY
Rey Eilers
ATTORNEY

United States Patent Office 2,899,039
Patented Aug. 11, 1959

2,899,039

COIN SEPARATORS

Gustav F. Erickson, Kirkwood, Mo., assignor, by mesne assignments, to National Rejectors, Inc., St. Louis, Mo., a corporation of Missouri Application January 27, 1954, Serial No. 406,393

51 Claims. (Cl. 194—72)

This invention relates to improvements in coin separators. More particularly, this invention relates to improvements in coin handling devices which can receive and separate coins, and can pay out predetermined amounts of change.

It is therefore an object of the present invention to provide an improved coin handling device which can receive and separate coins and can pay out predetermined amounts of change.

In the vending machine art, it is customary to design the machines so they can dispense food or other products when coins of a particular denomination are inserted in the coin slots of these machines. In some instances the vending machines will be designed to dispense products when nickels are inserted in the coin slots, and in other instances the vending machines will be designed to dispense products when dimes are inserted in the coin slots. The nickel-actuated vending machines can "make a sale" to customers who have nickels, but can not "make a sale" to customers who have only dimes and quarters. Similarly, the dime-actuated machines can "make a sale" to customers who have dimes, but can not "make a sale" to customers who have only nickels and quarters. The inability of such vending machines to respond to more than one denomination of coins limits the number of sales which those vending machines can make; and those vending machines could serve more customers and provide a greater return for their owners if they could respond to nickels, dimes and quarters. Accordingly, it has become desirable to equip vending machines with coin handling devices that can receive coins of different denominations, that can separate those coins, that can actuate the vending machines whenever coins equalling or exceeding the purchase price are introduced into the coin slots of those vending machines, and that can pay out change whenever coins exceeding the purchase price are introduced into those coin slots. Several such coin handling devices have been proposed, and a few such devices have been built; and those coin handling devices are known as coin changers. Some coin changers are electrically operated, while other coin changers are mechanically operated. The present invention relates to mechanically operated coin changers.

The present invention provides a coin changer that has a reservoir to hold coins that can be paid out as change, and that has two pay-out slides mounted adjacent that reservoir. One of those slides has a coin-receiving opening which can accommodate a predetermined number of coins, while the other slide has a coin-receiving opening which can accommodate a greater number of coins. These slides can be moved together or can be moved independently; and the coin changer can respond to a coin of one denomination to move just the one slide, and can respond to a coin of larger denomination to move both slides together. In this way the amount of change that is paid out is controlled by the denomination of the inserted coin.

The payout slides provided by the present invention have longitudinally-extending ridges formed therein. The longitudinally-extending ridges of the upper slide will bear against a horizontally-disposed wall at the bottom of the coin reservoir, and will reduce the drag and friction between that slide and that wall. The longitudinally-extending ridges in the lower slide will bear against the lower surface of the upper slide, and will reduce the drag and friction between those slides. The longitudinally-extending ridges in the slides are disposed out of register with each other to avoid any unsedirable interaction between those ridges. The ridges will be shallower than the thickness of coins to be held by the coin-receiving openings in the slides, so that coins can not tend to enter the spaces defined by the ridges and thereby jam themselves and the slides against movement. However, those longitudinally-extending ridges of the slides will be deep enough to enable them to constitute the sole areas of engagement with the surfaces relative to which the slides will move. The slides will be held by guides at the opposite edges of those slides and will be confined to straight reciprocatory paths, and the longitudinally-extending ridges of those slides will be set parallel to those paths. In this way the drag and friction between the slides and the surfaces relative to which they move will be kept to a minimum. It is therefore an object of the present invention to provide a plurality of payout slides, to provide each of those slides with longitudinally-extending ridges, and to dispose those longitudinally-extending ridges out of register with each other.

The slides are selectively movable between a position adjacent a discharge opening and a position adjacent the coin reservoir; and the coin-receiving openings in those slides will accept coins from the coin reservoir and will transport those coins to the discharge opening, where they can fall through that opening. One of the slides will be disposed below the level of the coin reservoir, and the opening in that slide will receive the said predetermined number of coins. The other slide will be disposed below the level of the said one slide, and the opening in that other slide will receive the said greater number of coins. When the slides are in register with the discharge opening, the said greater number of coins will fall directly from the said other slide to the discharge opening, and the said predetermined number of coins will fall from the said one slide to the opening in the said other slide and thence to the discharge opening, the diameters of the openings in the slides will have to closely approximate the diameters of the coins in the coin reservoir, but the diameter of the discharge opening can be made larger than the diameter of the openings in the slides. The large diameter of the discharge opening enables the greater number of coins in the said other slide to fall to and through the discharge opening without any delay or hesitation; and the positioning of the said one slide above the said other slide minimizes the overall time required to empty both slides, since it takes a shorter time for the predetermined number of coins to fall through the opening in the said other slide than it would take for the greater number of coins to fall through the opening in the said one slide if the positions of the slides were reversed. This rapid emptying of both slides is of great importance in mechanically-operated vending machines because some persons, who operate such vending machines, tend to operate the handles or levers of those machines with great force and speed. Also, they sometimes tend to operate the vending machines with little or no pause between the cycles thereof. In either case the time interval, during which the coins can fall to the discharge opening from the payout slides, tends to become quite short. As a result, unless the coins are immediately freed from the payout slides, those slides may not release all of their coins and the customer may not get all of the change due him. The rapid emptying of the coin slides, that is provided by the present invention, avoids any "short changing" of the customer. It is therefore an object of the present invention to provide a coin changer that has one payout slide for a predetermined number of coins, that has another payout slide for a greater number of coins, that disposes the said one slide above the level of the said other slide, and that disposes those slides below the level of the coin reservoir but above the level of the discharge opening of the coin changer.

In a number of coin changers, the coin-receiving openings of the payout slides are normally held in register with the coin reservoir; being selectively movable into register with the discharge opening to deliver change. Unless the overall height of each slide closely approximates the overall height of the one or more coins held by that slide, a coin that is held by the coin-receiving opening of one of the slides could extend part way into the coin-receiving opening of the other slide, or vice versa; and in either case that coin would tend to lock those slides against independent movement. Yet, it is impossible to make the overall height of each coin slide closely approximate the overall height of the one or more coins held by that slide because the height of a worn coin is appreciably less than that of a newly minted coin. Consequently, the payout slides of coin changers, which normally maintain the coin-receiving openings of the slides thereof in register with the coin reservoir, are subject to accidental locking of those slides against independent movement. The present invention obviates any such locking of the payout slides by normally maintaining the coin-receiving openings of those slides in register with the discharge opening of that coin changer. Where this is done, a coin in the coin-receiving opening of the said one slide can not extend part way into the coin-receiving opening of the other slide during independent movement of that one slide since the coin-receiving openings of the slides will be out of register with each other during the movement. Only when the payout slides are moving together or are empty will the coin-receiving openings thereof be in register, and at such times there is no problem of a coin or coins blocking independent movement of those slides. In this way the present invention assures full and free movement of the one slide relative to the other slide. It is therefore an object of the present invention to normally maintain the payout slides of a coin changer with their coin-receiving openings in register with the discharge opening of the coin changer.

When desired, one of the coin slides of the coin changer provided by the present invention can be locked against movement. In particular, the coin slide with the coin-receiving opening for the said predetermined number of coins can be locked against movement while it is in register with the coin reservoir. The other slide will still be able to reciprocate and to pay out the said greater number of coins. When both slides are movable, the coin changer can move both slides and provide one quantity of change when a large denomination coin is inserted, and can move just the one slide and provide a lesser quantity of change when a smaller denomination coin is inserted. Where the said one slide is locked against movement, the coin changer can respond to the said larger denomination coin to provide a quantity of change that is less than the first said, but is greater than the second said, quantity of change. Hence by selectively freeing and locking the said one payout slide, the coin changer of the present invention can provide three different quantities of change. It is therefore an object of the present invention to provide a coin changer with two coin slides and to provide a latch that selectively holds one of those slides against movement.

The selective latching of the said one slide enables the coin changer to respond to the larger denomination coin and deliver one or the other of two predetermined quantities of change. Hence the selective latching of the said one slide provides a ready way of changing the purchase price of the articles being vended by the vending machine embodying the coin changer of the present invention.

The coin slides of the coin changer provided by the present invention are promptly moved into registry with the coin reservoir whenever a coin, which will require the paying-out of change, is introduced into the coin changer. Thereafter the coin slides are held adjacent that coin reservoir throughout substantially the rest of the cycle of the coin changer. This is desirable because it gives the coins in the coin reservoir ample time in which to fall into the coin-receiving openings of the slides. Such an arrangement makes certain that the customer does not lose some change which should have dropped into the coin-receiving openings of the slides but was kept from doing so because the coin slides were in register with the coin reservoir for too short a period of time. It is therefore an object of the present invention to provide a coin changer wherein the coin slides are normally in register with the discharge opening of the coin changer but are promptly moved into register with the coin reservoir and are held there for substantially the rest of the cycle of the coin changer.

When a coin slide must accommodate a multiplicity of coins, and when those coins must drop from a coin reservoir into the opening of that coin slide, those coins can sometimes assume a tilted position in that opening. This is objectionable since it could lead to jamming of the slide and since it could lead to inadvertent and premature release of coins from that opening. The present invention obviates this objection by providing a coin-supporting surface, at the bottom of the slide, which partially underlies the coin-receiving opening of that slide. This surface will intercept coins that move toward a tilted position, and will force those coins to assume a position parallel to the slide; and as a result, jamming of the slide and premature release of the coins are obviated. It is therefore an object of the present invention to provide a coin-supporting surface, at the bottom of a coin slide, which partially underlies the coin-receiving opening of that slide.

The coin changer provided by the present invention can receive coins of different denominations. In one embodiment of the present invention, pennies, nickels, dimes and quarters are received. The pennies, dimes and quarters pass to a coin box after they have actuated the coin changer; and the nickels pass to the coin reservoir after they have actuated the coin changer. It is frequently desirable to reject one or more of these coins; and detents can be provided adjacent the coin passageways of the coin changer to intercept the coins and direct them back to the customer. For example, where the price of the product being vender by the vending machine is nine cents or less, it is desirable to reject dimes and quarters whenever the number of nickels in the coin reservoir falls below a predetermined level; and when the price of the product being vended by the vending machine is between nine cents and fifteen cents, it is desirable to reject quarters when the number of nickels in the coin reservoir falls below a predetermined level. Previously proposed detents could not be interconnected to reject dimes and quarters for a desired period and thereafter be easily interconnected in a different manner to reject quarters alone; instead those detents had to be re-worked to provide the desired rejection of quarters alone. The present invention, on the other hand, provides nickel, dime and quarter detents that can be interconnected as desired merely by moving a few screws. As a result, those detents can reject dimes and quarters whenever desired, and can be caused to accept dimes and reject quarters merely by changing the position of a few screws.

It is desirable to equip coin changers with coin separators, commonly known as slug rejectors; because such coin separators will discriminate between authentic and spurious coins and will keep the vending machines from delivering goods, and will keep the coin changers from paying out change, upon the insertion of spurious coins. The slug rejectors will have a number of spaced apart coin passageways and those coin passageways must be made to register with appropriate coin passageways in the coin changers. The present invention makes it possible to attain perfect and precise alignment of the coin passageways in a slug rejector with the coin passageways in a coin changer by providing adjustable mounting brackets on the coin changer. By suitably adjusting the position of those mounting brackets, it is possible to attain completely accurate registrations of the coin passageways in the slug rejector and in the coin changer. It is therefore an object of the present invention to provide adjustable brackets for mounting the slug rejectors on coin changers.

The coin changers provided by the present invention directs some of the coins, that it receives, to the coin reservoir; and those coins are eventually paid out as change. Those coins are conducted along a passageway and fall through an opening at the upper end of the coin reservoir. Because customers differ in the force and speed with which they manipulate the handles of vending machines, it is necessary to compensate for unduly rapid movement of the coins along the said passageway. In the absence of such compensation, those coins might be caused to overshoot the opening at the upper end of the reservoir. The present invention obviates any such overshooting of the opening in the reservoir by providing a stop that can be placed in register with the passageway and that will be adjacent the far side of that opening. Any coins that are moving along the passageway at high rates of speed will strike that stop, and will be forced to slow down and fall through the opening into the reservoir. It is therefore an object of the present invention to provide a stop that can be placed in register with the coin passageway leading to the coin reservoir and that can prevent overshooting of the reservoir.

The stop provided by the present invention is selectively movable out of register with the coin passageway whenever the reservoir is filled; and thereafter additional coins can continue along the passageway past the reservoir. In the absence of such an arrangement, coins could jam the coin passageway whenever the reservoir became filled. The stop provided by the present invention will actually be moved into register with the coin passageway only when the number of coins in the coin reservoir is below a predetermined value. Consequently, jamming is avoided but prompt filling of the reservoir is assured. It is therefore an object of the present invention to provide a movable stop that is moved into register with the passageway only when the number of the coins in the reservoir is below a predetermined value.

The present invention provides a closure that moves in conjunction with a stop but is out of register with that stop. This closure will cover the opening in the reservoir whenever the reservoir is filled and will thus make absolutely certain that additional coins roll past the reservoir. However, that closure will be out of register with the opening in the reservoir whenever the stop is in register with the coin passageway. Consequently when the stop halts coins that would otherwise tend to overshoot the reservoir, the closure will not keep those coins from entering that reservoir. The conjoint action of the stop and the closure assure prompt filling of the reservoir while preventing jamming of the coin passageway when the reservoir is filled. It is therefore an object of the present invention to provide a stop and closure which can be moved conjointly but which are spaced apart.

It is sometimes desirable to introduce a number of coins directly into the coin reservoir, without having to operate the vending machine. The present invention makes this possible by providing sufficient play in the coin changer mechanism to enable the handle to turn and move the closure out of register with the coin reservoir before the vending machine is actuated. As a result, it is possible to fill the coin reservoir without having to operate the vending machine. It is therefore an object of the present invention to provide sufficient play in the handle of a coin changer mechanism to enable the closure of the coin reservoir to uncover that reservoir without having to operate the vending machine.

The coin changer provided by the present invention has a coin carrier with openings in the bottom thereof. Levers extend into the upper portion of the coin carrier and will act to force coins toward and out of those openings. This is desirable since it assures positive emptying of the coin carrier after the coins have acted upon the levers. Thus, the present invention obviates the retention of coins in the coin carrier during unusually fast cycles of operation. Any such retention is objectionable since it could lead to the dispensing of merchandise and change that was not paid for. It is therefore an object of the present invention to provide a coin carrier with openings in the bottom thereof and to provide levers that extend into the upper portion of the coin carrier and force coins toward and out of openings after the coins have moved the levers.

The coin carrier of the present invention has a number of spaced coin-receiving recesses. These recesses will accept and hold coins, and will carry those coins to an accepted coin chute during the cycle of the vending machine. However if the customer, between the time he deposits the coins in the coin chute and the time he operates the handle of the vending machine, decides he would like to have his coins returned to him, he need only actuate a lever which is connected to a platform that is normally disposed under the coin carrier. This lever will move the platform and permit the coins to fall to a returned coin chute. This chute will conduct the coins to a point at the exterior of the vending machine where the customer can retrieve them. The platform normally overlies the return coin chute and it will keep coins from falling into that chute as the coin carrier moves toward the accepted coin chute. When the platform is moved to uncover the returned coin chute, it will overlie and close the accepted coin chute; thereby keeping coins from being accepted accidentally. In this way, the present invention gives full protection to the owner of the vending machine and gives equally complete protection to the customer. It is therefore an object of the present invention to provide a coin carrier and to provide a platform which can be moved between the accepted coin chute and the returned coin chute to selectively block those chutes and prevent accidental acceptance or returning of coins.

The actuating mechanism for the coin carrier and the actuating mechanism for the platform are interlocked so the two cannot be actuated simultaneously. Such an interlock prevents the customer from actuating the vending machine and simultaneously returning the coins to the returned coin chute where they could be recovered by the customer. This is necessary to protect the owner of the vending machine from the dispensing of goods without a corresponding payment by the customer.

Some coin changers can receive and hold just the coin or coins needed to actuate them; and those coin changers will reject all additional coins until the coin changer has been actuated and the said coin or coins transferred to the coin box. This rejection of the additional coins can inconvenience the customer since he may have to hold the cups or bottles or packages from previous cycles of the vending machine while searching through his pockets for additional coins. The present invention obviates this inconvenience by enabling the coin changer to hold additional coins; the coin changer using those additional coins to assure additional operations of the vending machine, or returning those additional coins to the customer if he changes his mind and wants them returned to him. The coin changer provided by the present invention uses a coin-supporting element adjacent the coin carrier to hold the additional coins, and that element serves as an escrow device. It is therefore an object of the present invention to provide a coin changer with an escrow device to hold additional coins.

The escrow device provided by the present invention moves into coin-supporting position when the coin carrier moves toward the accepted coin chute; and it holds the additional coins until the coin carrier starts its return stroke. During that return stroke, the escrow device will move out of the path of the coin carrier and transfer the additional coins back to the coin carrier. The lowermost of those coins will then seat in the recesses of the coin carrier and will prepare the vending machine for another cycle. In this way the movement of the coin carrier and the escrow device are interrelated, and the transfer of the additional coins from one to the other is made certain and sure. It is therefore an object of the present invention to provide a coin changer with an escrow device that moves into coin-supporting position when the coin carrier moves toward the accepted coin chute and which moves out of the path of the coin carrier during the coin carrier's return stroke.

The coin carrier provided by the present invention can be equipped with dummy coins that will be held in tandem relation with inserted coins to actuate the coin changer. When the dummy coins are used, the sales price of the product will be reduced by the value of the coins which the dummy coins replace; and when the dummy coins are not used, the full sales price will be collected. Thus, the selective use of dummy coins enables the coin changer of the present invention to provide two different sales prices for the product being vended.

The dummy coins provided by the present invention are held in the coin carrier by interacting surfaces on those coins and on the walls of the recesses of the coin carrier, and those interacting surfaces permit the dummy coins to roll back and forth in the recesses of the coin carrier. This is necessary since it keeps the dummy coins from actuating the levers of the coin changer until the inserted coins enter and seat in the recesses of the coin changer. At the same time, the interacting surfaces on the dummy coins and on the walls of the recesses of the coin carrier will hold the dummy coins from blocking the entry of the inserted coins in those recesses. It is therefore an object of the present invention to provide a coin changer with interacting surfaces, on dummy coins and on the walls of the recesses of the coin carrier, that keep those dummy coins from actuating the levers of the coin changer until the inserted coins enter and seat in those recesses, and that will keep the dummy coins from blocking the entry of those inserted coins.

The coin carrier of the coin changer provided by the present invention moves in a straight reciprocatory path. This path is adjacent a stationary coin passageway, and in the event additional coins are resting upon the coin carrier those coins must be lifted upwardly into the coin passageway to free the coin carrier for movement relative to that passageway. This lifting action is provided by a plate that is intermediate the coin carrier and the coin passageway and that is disposed below the center line of any additional coins supported on the coin carrier. Consequently, when the coin carrier moves those additional coins toward the plate, the smoothly rounded lower surfaces of those coins will strike that plate and will be raised upwardly and out of the path of the coin carrier. It is therefore an object of the present invention to provide a coin-raising plate intermediate the coin carrier and the coin passageway of a coin changer.

The coin carrier of the coin changer provided by the present invention has a recess for pennies; and a lever is mounted adjacent that coin carrier to respond to those pennies. This lever will normally be in position to block actuation of the coin changer and vending machine, but it can respond to the insertion of pennies to move out of blocking position. In addition the coin changer has a latch that can be set to hold the penny-actuated lever out of blocking position, thereby enabling the coin changer to operate without pennies. This arrangement enables the coin changer of the present invention to be used with vending machines that dispense articles whose sales price is an integral multiple of five cents or is an integral multiple of five cents plus one or more cents. It is therefore an object of the present invention to provide a coin changer with a latch that can selectively hold the penny-actuated lever out of blocking position.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 3:
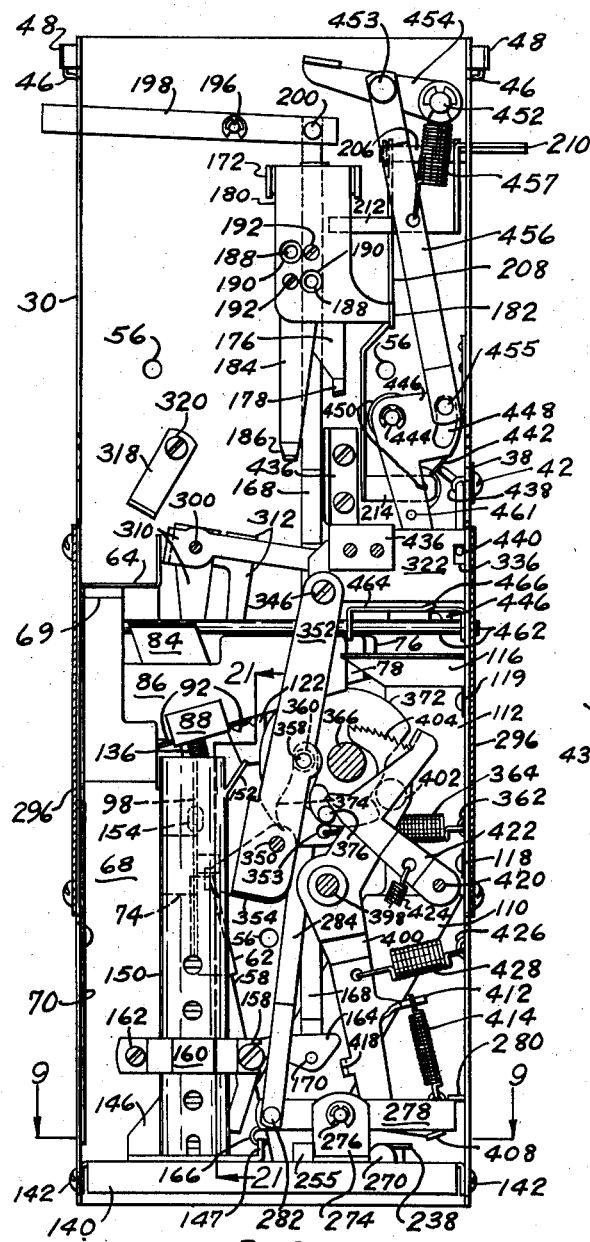
Figure 4:
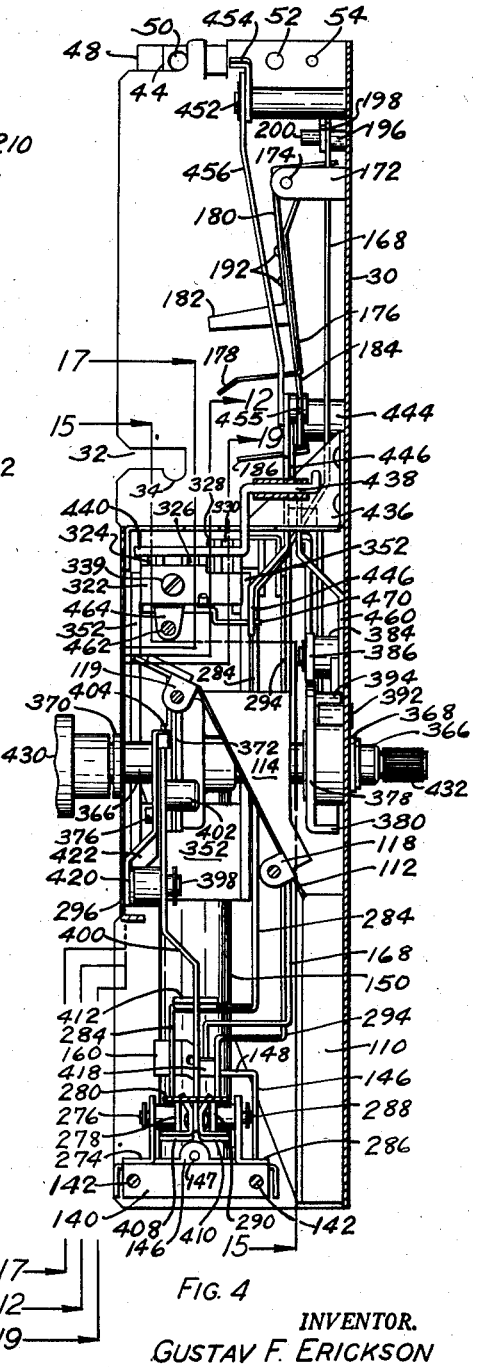

In the drawing,

Fig. 1 is a front elevational view of a coin changer that is made in accordance with the principles and teachings of the present invention, Fig. 2 is a partially broken-away, side elevational view of the coin changer of Fig. 1, Fig. 3 is a sectional front view of the coin changer of Figs. 1 and 2, and it is taken along the plane indicated by the line 3—3 in Fig. 2, Fig. 4 is a sectional side view of the coin changer of Figs. 1–3, and it is taken along the plane indicated by the line 4—4 in Fig. 1, Fig. 5 is a partially sectioned, enlarged, front elevational view of the platform actuating mechanism of the coin changer of Figs. 1–4, Fig. 6 is similar to Fig. 5, but it shows the platform in coin-freeing position.

Fig. 7 is a front elevational view of the coin reservoir, coin-level testing mechanism, and the coin-rejecting detents of the coin changer of Figs. 1–4, Fig. 8 is a sectional side view of the coin-rejecting detents of Fig. 7, and it is taken along the plane indicated by the line 8—8 in Fig. 7, Fig. 9 is a sectional plan view of the payout slides and the coin reservoir of the coin changer of Figs. 1–4, and it is taken along the plane indicated by the line 9—9 in Fig. 3, Fig. 10 is a front elevational view of the coin-rejecting detents of the coin changer of Figs. 1–4, Fig. 11 is a sectional side view of the coin-rejecting detents of Fig. 9, and of a sign associated therewith, and it is taken along the plane indicated by the line 11—11 in Fig. 10, Fig. 12 is a sectional front view of the lower part of the coin changer of Figs. 1–4, and it is taken along the plane indicated by the line 12—12 in Fig. 4.

Fig. 13 is a sectional front view of the portion of the coin changer shown in Fig. 12, and it shows that portion as it appears during part of a change making operation, Fig. 14 is a partially broken away, partially sectioned perspective view of the coin reservoir, the payout slides, and the coin-supporting surface associated therewith, Fig. 15 is a sectional front view of the accepted and returned coin chutes, and of the coin carrier of the coin changer provided by the present invention, and it is taken along the plane indicated by the line 15—15 in Fig. 4.

Fig. 16 is a sectional front view of the ratchet and pawl and coin carrier of Fig. 15, Fig. 17 is a sectional front view of the lower part of the coin changer of Figs. 1–4, and it is taken along the plane indicated by the line 17—17 in Fig. 4, Fig. 18 is a partially broken-away, front elevational view of the lower part of the coin changer of Figs. 1–4, Fig. 19 is a sectional front view of the lower part of the coin changer of Figs. 1–4, and it is taken along the plane indicated by the line 19—19 in Fig. 4, Fig. 20 is similar to Fig. 19, but it shows the elements of the coin changer as they appear during a change making operation, Fig. 21 is a sectional side view of the accepted coin chutes structure of the coin changer, and it is taken along the plane indicated by the line 21—21 in Fig. 3, Fig. 22 is similar to Fig. 21, but it shows the stop moving toward the coin passageway it is to block, Fig. 23 is similar to Fig. 21, but it shows the stop in full registry with the coin passageway it is to block, Fig. 24 is a perspective view of the coin-actuated levers and the slide-actuating elements of the coin changer, Fig. 25 is a partially-sectioned perspective view of the coin carrier of the coin changer, Fig. 26 is a left hand side view of the accepted coin chutes of Figs. 21–23, Fig. 27 is a plan view of the accepted coin chutes of Figs. 21–23 and 26, Fig. 28 is a perspective view of the stop and closure for the change-coin chute and reservoir, and Fig. 29 is a sectional view of the lower coin slide and of the horizontal wall therebeneath.

Referring to the drawing in detail, the numeral 30 denotes the frame of one form of coin changer provided by the present invention. This frame is generally U-shaped in plan; having a vertically directed rear wall and two vertically-directed side walls that are perpendicular to said rear wall. The major portion of the front of the frame 30 is open.

Two horizontally directed slots 32 are formed in the frame 30; one of those slots being in the left hand side wall of the frame 30, and the other of those slots being in the right hand side wall of the frame 30. The slots 32 extend rearwardly from the front edges of the side walls of the frame 30; and downwardly extending notches 34 are contiguous with the rear ends of those slots. Two threaded openings, not shown, are provided in the right hand side wall of the frame 30 at the approximate level of the notch 34 in that side wall. These openings receive screws 42 which extend through elongated, horizontally-directed openings 36 in an adjustable bracket 38. The screws 42 will seat in the two openings in the right hand side wall of the frame 30 and will clamp the bracket 38 against movement relative to that side wall. However, loosening of the screws 42 will coact with the elongation of the openings 36 in the bracket 38 to permit horizontal adjustment of the position of bracket 38 relative to the notch 34 in that right hand side wall.

The bracket 38 has a notch 40 therein which is narrower than the notch 34 in the right hand side wall of the frame 30, and those notches will normally be in register with each other. However, since notch 40 is narrower than notch 34, the position of notch 40 will control the position of ears 43 of a coin separator 45. The ears 43 are cylindrical in form; and the diameter of the right hand ear 43 is substantially equal to the diameter of the notch 40 in bracket 38. Hence notch 40 closely confines that right hand ear; and forward and rearward movement of the bracket 38 will cause forward and rearward movement of notch 40; thereby causing forward and rearward movement of said ear 43. This movement of the right hand ear 43 controls the position of the bottom of the coin separator 45 relative to the frame 30.

Coin separators of different kinds can be used, but the coin separator 45 is preferred. That coin separator is shown and described in Merral P. Haverstick application Serial No. 370,456 which was filed July 27, 1953 for Coin Separators. That coin separator can receive four coins of different denominations, can separate those coins from spurious coins or slugs, and can separate those coins from each other and deliver the separated coins to the four spaced passageways shown in section in Fig. 2 hereof.

The upper and forward edges of the side walls of the frame 30 are cutaway as at 44. Ears 46 are punched out of the side walls of the frame 30 at points which are spaced rearwardly of the cutaway portions 44. These ears 46 are also spaced rearwardly of the notch 34 in the right hand side wall of the frame 30; and they are bent outwardly and upwardly to define two slots at the outer faces of the side walls of the frame 30.

Leaf springs 48 are mounted in those slots with the rear ends thereof extending toward the rear of the side walls of the frame 30. The rear ends of the leaf springs 48 have notches in them, and those notches telescope over and are held against shifting by pins 54 which are seated in the upper ends of the side walls of the frame 30. Rivets 52 extend through openings in the springs 48, intermediate the ends of those springs; and those rivets are seated in openings in the side walls of the frame 30 and serve to hold the leaf springs 48 in assembled relation with the side walls of the frame 30. Openings 50 are provided in the forward ends of the leaf springs 48, and those openings are in register with each other. The openings 50 will receive and hold the ears 47 on the upper portion of the coin separator 45. The forward ends of the springs 48 are bent outwardly so they can receive and be bowed outwardly by the ears 47 on the coin separator 45. However, that outward bowing of the springs 48 is not unlimited, because the ears 46 will positively limit that outward bowing to the point where the springs 48 cannot be bowed beyond their elastic limits. This protects those springs against abuse and injury from inexperienced users.

The numeral 56 denotes openings in the rear wall of the frame 30, and those openings can receive fasteners which will support that frame. Those fasteners will usually be machine screws that seat in the frame of a vending machine, and will serve to secure the frame 30 to the frame of that vending machine. Three such openings 56 are provided for the frame 30, but a greater or lesser number of openings 56 can be provided. Similarly, other methods of supporting the frame 30 can be substituted for the openings 56 and the fasteners that extend therethrough.

A U-shaped channel 58 is disposed adjacent the rear wall of the frame 30 with its open side abutting that rear wall. The channel 58 has an ear 60 formed thereon, and that ear will receive a screw which can seat in the rear wall of the frame 30. A pivot bracket 62 is secured to channel 58 by soldering or welding. When the channel 58 is secured to the rear wall of the frame 30 by the screw in the ear 60, that channel will cooperate with the rear wall to define a coin chute that inclines downwardly from the left hand side wall of frame 30 to a point adjacent the center of the rear wall of that frame. That coin chute will receive coins and slugs that are rejected or returned by the coin separator 45.

An L-shaped trough 64 has a bottom wall that inclines downwardly from the front to the rear of the frame 30, and the free edge of that bottom wall abuts the left hand side wall of that frame. The rear edge, which is also the lower edge, of that bottom wall is soldered or welded to the upper end of channel 58. The L-shaped trough 64 will coact with the left hand side wall of frame 30 to define a sloping-bottom chute of U-shaped cross section which underlies the rejected and returned coin passageways of the coin separator 45; and that chute will direct any rejected and returned coins from those passageways to the chute defined by channel 58 and the rear wall of frame 30.

The numeral 66 denotes a vertical plate that has an inclined wall 68 formed integrally therewith. The left hand edge of the inclined wall 68 has a flange 70 thereon, and that flange abuts the left hand side wall of the frame 30. The inclined wall 68 spaces the plate 66 from the left hand side wall of the frame 30; but that inclined wall coacts with the vertical plate 66 and with the rear and left hand side walls of frame 30 and with a portion of two walls of channel 58 to define a chute for accepted coins. This accepted coin chute will underlie the L-shaped trough 64.

The upper end of the inclined wall 68 projects vertically above the top of the plate 66, and that upper end is substantially vertical. The top edge of that upper end of the inclined wall 68 is bent forwardly, as at 69, to engage and be parallel to the bottom of L-shaped trough 64. This facilitates securement of that top edge to the bottom of L-shaped trough 64 by soldering or welding.

A vertically directed flange 72 is formed on the rear edge of plate 66, and that flange is suitably secured to the U-shaped channel 58 by soldering or welding. A stop 74 is mounted on the vertical plate 66, and the upper end of that stop can be suitably bent by a pair of pliers or other suitable tool. The bending of the upper portion of the stop 74 facilitates precise adjustment of other portions of the coin changer relative to the coin chute structure.

A U-shaped trough 76 has a flange 77 at one end thereof, and that flange is soldered or welded to the upper end of plate 66. The bottom of trough 76 inclines upwardly from left to right, as that trough is viewed in front elevation, and its lower end communicates with the coin chute defined by plate 66, inclined wall 68 and frame 30. The trough 76 is approximately midway between the front and rear of the frame 30, and it is disposed so it is parallel to the rear wall of that frame.

The numeral 78 denotes a vertically directed plate with oppositely directed flanges. This plate is spaced a short distance in front of the front wall of trough 76, and it coacts with that front wall to define a coin passageway. One of the flanges on plate 78 is denoted by the numeral 80, and that flange extends to and underlies the bottom of trough 76. The free edge of that flange is soldered or welded to the bottom of trough 76. The flange 80 serves as a bottom for the coin passageway defined by plate 78 and the front wall of trough 76; and that bottom inclines downwardly from right to left as the plate 78 is viewed in elevation. The flange 80 extends just about half way from the right hand, which is also the upper, end of plate 78 toward the other end of that plate. Consequently the bottom of the said passageway is half open and half closed.

The other flange on the plate 78 is denoted by the numeral 82, and that flange extends away from the trough 76. That flange is soldered or welded to a flange 87 that extends rearwardly from a U-shaped trough 86. The trough 86 is adjacent the front of the frame 30. The bottom of trough 86 inclines downwardly from right to left, as that trough is viewed in elevation, and the lower end of that trough communicates with the coin chute defined by plate 66, inclined wall 68 and frame 30.

Trough 76 will conduct two coins of different denominations to the chute defined by plate 66 and inclined wall 68 and frame 30, trough 86 will conduct a third coin to that chute, and plate 78 and flange 80 thereon can start a fourth coin toward that chute. That chute, those troughs, and that plate and flange constitute the accepted coin chute of the coin changer.

The right hand end of the front wall of trough 86 is soldered or welded to the upper portion of the inclined wall 68. Hence the channel 58, the L-shaped trough 64, the vertical plate 66 and inclined wall 68, the U-shaped trough 76, the plate 78 and the U-shaped trough 86 are all soldered or welded together and constitute a fabricated unit which can be mounted on or separated from the frame 30 in unitary fashion.

The numeral 88 denotes an L-shaped bracket that has its vertical wall soldered or welded to the front wall or trough 86, and that has its horizontal wall spaced below the bottom of trough 86 to provide a recess-defining ledge. A plate, which is generally denoted by the number 89, has one edge thereof extending into that recess and supported by that ledge. The plate 89 is bent to have an upwardly projecting stop 90 thereon and to have a horizontally-directed closure 92 thereon. In addition, the plate 89 has a downwardly directed ear 94 and a downwardly directed apron 96. The stop 90 is dimensioned so it is wider than the coin passageway defined by the plate 78 and the U-shaped trough 76. Consequently, when the stop 90 is placed in register with that passageway, it will keep coins from passing out of the end of that passageway. The closure 92 of plate 89 is movable into and out of register with the open bottom of the said coin passageway, and it is wider than that open bottom. Hence that closure will serve as a continuation of the flange 80 and will direct coins to the left hand end of that passageway.

The closure 92 and the stop 90 are out of register with each other so that whenever the closure 92 acts as a part of the bottom of the coin passageway defined by trough 76 and wall 78, the stop 90 is out of register with that passageway. Conversely, when the stop 90 is in register with that passageway, the closure 92 leaves the right hand section of the bottom of that passageway open. The apron 96 is at the rear of plate 89, and it partially fills a space 67 at the upper edge of the vertical plate 66.

The numeral 98 denotes a lever which is mounted on a pivot 100; and the pivot 100 is secured to the pivot bracket 62. A pin 102 is mounted on the lever 98, and that pin will serve as a cam follower. A lug 104 is formed at one edge of the lever 98, and that lug projects outwardly beyond that edge to serve as a feeler. A pin 106 is mounted on the upper lever 98, and that pin secures the plate 89 to the lever 98 while permitting relative rotation between that plate and that lever. The pin 106 coacts with lever 98, pivot 100 and pivot bracket 62 to support the rear edge of plate 89, and the L-shaped bracket 88 will support the front edge of that plate.

When the lever 98 is rotated in a counter clockwise direction, as viewed in Figs. 21–23, it will move the plate to the position shown in Fig. 23. In that position the stop 90 is in register with the coin passageway defined by trough 76 and plate 78, while closure 92 uncovers the rear section of the bottom of that passageway. At such time, coins introduced into that passageway, adjacent the upper end thereof, will roll along flange 80 and then fall through the open bottom of that passageway. Those coins will be kept from passing out of the end of that passageway by the stop 90. When the lever 98 is rotated in a clockwise direction, as viewed in Figs. 21–23, it will move to the position shown in Fig. 21. In that position the stop 90 will be out of register with the end of the said passageway, and the closure 92 will serve as a part of the bottom of that passageway. At such time, coins introduced into the upper end of the said passageway will be conducted to and past the lower end of that passageway. The apron 96 will tend to block the opening 67 in all moved positions of plate 89; thereby keeping coins from escaping through that opening.

A spring 108 is wound around the pivot 100. One end of the spring 108 bears against the lower end of the lever 98 and the other end of that spring bears against the pivot bracket 62. This spring will bias the lever 98 for movement in a counter clockwise direction, as that spring and lever are viewed in Figs. 21–23. However, the spring will yield to permit rotation of the lever 98 in a clockwise direction.

The numeral 84 denotes an inclined portion of the rear wall of the plate 78. This portion 84 extends upwardly and forwardly of the frame 30 and overlies the U-shaped trough 86. The upper edge of the portion 84 of the wall 78 extends forwardly of the front edges of the frame 30.

The numeral 110 denotes a U-shaped channel which has the open side thereof abutting the rear wall of the frame 30. This channel is inclined so it extends from a point adjacent the right hand side wall of the frame 30 downwardly to a point adjacent the center of the rear wall of that frame. The lower end of the channel 110 registers with the cutaway portion 59 of the U-shaped channel 58. Thus, the lower ends of the channels 58 and 110 merge. An ear 111 is provided on the channel 110, and that ear can receive a screw which will hold the channel 110 in assembled relation with the rear wall of the frame 30.

An inclined wall 112 is formed integrally with the channel 110, and that wall extends forwardly and upwardly from the upper end of that channel. The right hand edge of that wall abuts the right hand side wall of the frame 30, and the left hand edge of that wall has a flange 114 thereon. This flange extends rearwardly toward the rear wall of the frame 30. A lip 116 is formed on the upper end of the inclined wall 112, and that lip is inclined forwardly and upwardly from the upper end of the wall 112. The front edge of the lip 116 is closely adjacent the front of the frame 30. An ear 118 is formed on the inclined wall 112, and an ear 119 is formed on the lip 116. Suitable fasteners, such as screws or bolts and nuts will extend through the ears 118 and 119 and rigidly secure the inclined wall 112 and the lip 116 to the right hand side wall of the frame 30.

The U-shaped channel 110, the inclined wall 112 and the lip 116 will act to receive coins that are to be returned to the customer by the coin changer, and they will thus constitute a returned coin chute. This chute will direct the coins to the vicinity of the cutaway portion 59 of the channel 58, and this enables one coin duct to receive returned coins from the coin changer and also to receive rejected and returned coins from the coin separator 45 and to conduct those coins to a point at the exterior of the vending machine where the customer can recover them.

The numeral 120 denotes a pivot that is secured to the rear wall of the frame 30, and that pivot is best shown in Fig. 16. A dog 122 is pivotally mounted on the pivot 120 and is thus able to rotate relative to the frame 30. As ear 124 is formed at the upper end of the dog 122, and that ear extends forwardly from the plane of the dog 122. An arm 126 extends to the left of the dog 122 and is formed as an integral part of that dog. An opening is provided in the end of the arm 126, and that opening receives the upper end of a spring 136. The lower end of the spring 136 is secured to a pin 134 that is seated in the rear wall of the frame 30. The spring 136 biases the dog 122 for rotation in a counter clockwise direction, as that dog is viewed in Fig. 16. Rotation of the dog 122 in a counter clockwise direction is limited by the stop 138 which is bent forwardly out of the rear wall of the frame 30. The outer end of the arm 126 of the dog 122 will strike the upper edge of the stop 138 and be held against further rotation in a counter clockwise direction. While the spring 136 normally biases the dog 122 into the position shown in Fig. 16, where the arm 126 bears against the stop 138, that spring can yield to permit rotation of the dog 122 in a clockwise direction.

The numeral 128 denotes another dog which is mounted on the pivot 120 for rotation relative to the frame 30 and for rotation relative to the dog 122. The dog 128 has an ear 130 which extends forwardly of the frame 30. The dog 128 has an opening therein which is in register with the opening in the arm 126 on the dog 122, and that opening will receive a spring comparable to the spring 136. The spring which acts upon the dog 128 is overlain by the spring 136 in Fig. 16 and cannot be seen. However, that spring will normally bias the dog 128 for counterclockwise rotation until the dog 128 engages and is held against further rotation by the upper edge of the stop 138.

As indicated in Fig. 16, the lower ends of the dogs 122 and 128 are in register when those dogs are in engagement with the stop 138. The ear 124 on the dog 122 can be moved to the right, as viewed in Fig. 16, to rotate the bottom of the dog 122 to the left of the bottom of the dog 128. Similarly, the ear 130 on the dog 128 can be moved to the right, as viewed in Fig. 16, to rotate the bottom of the dog 128 to the left. Also, both dogs 124 and 130 can be moved to the right to move the bottoms of the dogs 122 and 128 to the left.

The numeral 140 denotes a horizontally-directed plate with downwardly extending flanges. This plate is disposed adjacent the bottom of the frame 30, and it is held in that position by screws 142 which extend through the side walls of the frame 30 and seat in the end flanges of the plate 140. A circular opening 144 is provided in the plate 140 adjacent the left hand end of that plate. This opening will be slightly larger than the diameter of coins which are to be paid out as change by the coin changer. A bracket 146 which is generally C-shaped in configuration is mounted on the upper surface of the plate 140. The bottom of the bracket 146 has an opening which is slightly larger than the opening 144 but which is concentric with that opening. The difference between the diameters of the opening 144 and the opening in the bottom of the bracket 146 provides a narrow shoulder which can support the bottom of the coin reservoir 150. The bottom of the coin reservoir extends through the opening in the bottom of the bracket 146 and seats against the portions of the plate 140 which define the opening 144. The upper part of the bracket 146 has a horizontally-directed yoke 148 which engages the rear surface of the coin reservoir 150 and provides support for that rear surface. That horizontally-directed yoke also has a threaded opening, not shown, to receive a screw 162, and it has a threaded opening, not shown, to receive the pivot 158. An ear 147 is provided on the bracket 146 adjacent the right hand end of that bracket. This ear extends upwardly and has an opening therein.

The upper end of the coin reservoir 150 has a lip 152 bent out therefrom. This lip will be in alignment with the rear, open section of the bottom of the passageway defined by the plate 78 and the trough 76. Consequently, this lip can help guide coins which fall through that section of the bottom of that passageway into the coin reservoir 150. The coin reservoir 150 has a slot 154 in the rear thereof adjacent the top thereof. This slot is in register with the lug 104 on the lever 98, and it can receive that lug.

The upper end of the coin reservoir 150 must be made to register with the open section of the bottom of the coin passageway defined by the plate 78 and the trough 76, and the lever 98 must be set so the closure 92 will be out of register with the said coin passageway when the lug 104 is fully within the slot 154 but is in register with that passageway when the lug 104 is in the position shown by Fig. 21. This positioning of the upper end of the reservoir 150 and of the lever 98 is assured by the stop 74. The upper end of the coin reservoir will engage and bear against the lower portion of the stop 74, while the lever 98 will bear against the rearwardly bent upper portion of that stop. The upper portion of the stop will be bent after the fabricated chute structure is secured to the frame 30 and the coin reservoir has its lower end seated in the opening of the bracket 146. The upper end of the stop 74 can be bent rearwardly with a pair of pliers or another tool and must be bent rearwardly until it enables the lever 98 to place the stop 90 in register with the said coin passageway and to place the closure 92 out of register with the said passageway when that lever engages that rearwardly extending portion. A strap 160 extends from the pivot 158 to the screw 162 and holds the coin reservoir 150 against the stop 74. The bracket 146 will thus tightly confine the bottom of the coin reservoir 150 and the stop 74 will properly position the upper end of that coin reservoir.

A vertically directed slot 156 is formed in the right hand side of the coin reservoir 150, and that slot can receive one end of an L-shaped lever 164 which is mounted for rotation about the pivot 158. The lever 164 has an opening therein which receives the upper end of a spring 166, and the lower end of that spring extends into the opening of the ear 147 on the bracket 146. This spring biases the lever 164 for rotation in a clockwise direction, and biases the lower end of the lever 164 toward the slot 156 in the coin reservoir 150. An elongated connecting rod 168 has the lower end thereof pivotally secured to the other end of the L-shaped lever 164 by a pin 170. The connecting rod 168 has a horizontal offset therein adjacent the lower end thereof, and has an inclined offset portion somewhat above the middle thereof. This connecting rod extends up to a point adjacent the upper end of the frame 30 and extends between the arms of a U-shaped pivot bracket 172. This bracket is secured to the rear wall of the frame 30 by suitable means, such as rivets or welds.

A pivot 174 is mounted in openings in the arms of the pivot bracket 172, and that pivot supports a detent 176 with ears that have openings telescoping over the pivot 174. The ears are bent forwardly from the plane of the detent 176 and they span a distance which is less than the distance between the arms of the pivot bracket 172. The detent 176 has a coin-intercepting portion 178 thereon which also extends forwardly from the plane of that detent. A second detent is denoted by the numeral 180, and that detent has ears which extend rearwardly from the plane of that detent. These ears will fit between the inner faces of the arms of the pivot bracket 172 and the outer faces of the ears on the detent 176. The ears on the detent 180 will have openings which can telescope over the pivot 174. A coin-intercepting portion 182 of the detent 180 extends forwardly from the plane of that detent. A third detent 184 has a coin-intercepting portion 186 extending forwardly from the plane of that detent. The detent 184 has no ears since it will be supported by the detent 176 or the detent 180. The detents 176 and 180 can rotate relative to the frame 30 and relative to each other.

The detent 180 has a pair of large openings 190 therein and has a pair of smaller openings 194 therein. The large openings 190 in the detent 180 are in register with openings 188 in the detent 184. The openings 188 in the detent 184 are in register with threaded openings, not shown, in the detent 176. The smaller openings 194 in the detent 180 are in register with threaded openings, not shown, in the detent 184. Screws 192 can extend through openings 190 in the detent 180 and through the openings 188 in the detent 184 and seat in the openings, not shown, in the detent 176. The openings 190 are larger than the heads of the screws 192 and will enable the detent 180 to move relative to the detents 176 and 184. The screws will then cause the detents 176 and 184 to move as a unit and yet permit the detent 180 to move independently of that unit. The screws 192 can be removed from the openings 190 in detent 180 and openings 188 in detent 184 and from the threaded openings in detent 176 which are in register with the openings 188 in detent 184, and thereafter those screws can be extended through the openings 194 in the detent 180 and seated in the threaded openings in the detent 184 which are in register with the openings 194. At such time, the screws 192 will interrelate the detents 180 and 184 for simultaneous and conjoint movement while permitting the detent 176 to move independently and by itself. Thus, by merely shifting the two screws 192, the operator can select which combination of detents he wants to move together.

An ear 181 extends rearwardly from the top of the detent 180, and that ear extends through an elongated slot 169 in the connecting rod 168. The elongated nature of the slot 169 provides a desirable lost-motion connection between the connecting rod 168 and the detent 180. When the connecting rod 168 is pulled downwardly, as indicated particularly in Fig. 7, the upper end of the elongated slot 169 will engage the ear 181 and force it downwardly, thereby rotating the detent 180 about the pivot 174. This rotation forces the coin-intercepting portion 182 of the detent 180 forwardly into coin-intercepting position. If the detent 184 is secured to the detent 180 by the screws 192, the coin-intercepting portion 186 of that detent will also be forced into coin-intercepting position. If the connecting rod 168 is in its upper position, as will be the case when the L-shaped lever 164 assumes the position indicated by dotted lines in Fig. 7, the upper edge of the elongated slot 169 will be out of engagement with the ear 181 on the detent 180. However, the detent 180 can still be moved into coin-rejecting position because the slot 169 is long enough to permit the ear 181 to move downwardly even though the connecting rod 168 is in its upper position. That detent can be so moved when the vending machine becomes empty. For example, an actuator 217 of the vending machine can pass through an opening, not shown, in the rear wall of the frame 30 and strike an arm 214 on the lower end of a lever 208. This lever is supported on a pivot 206 that is secured to the right hand side wall of the frame 30 and which extends parallel to the rear wall of that frame. When the actuator 217 strikes the arm 214 of the lever 208, it causes that lever to move forwardly. Thereupon, the arm 212 of the lever 208 will strike the rear of the detent 176 and force that detent to move forwardly toward coin-rejecting position. The detent 176 will also engage the detent 184 and force it and the detent 180 into coin-rejecting position. This movement of the detents 176, 180 and 184 can occur even though the connecting rod 168 is in the position where those detents are normally out of coin-rejecting position. Thus the elongated character of the slot 169 in the connecting rod 168 enables that rod to actuate the detents 176, 180 and 184 whenever the lever 164 moves into the coin reservoir 150, but also permits the lever 208 to actuate those detents and move them toward coin-rejecting position when the lever 164 is not in the coin reservoir 150. When the lever 208 moved, it also moved its arm 210 and that arm forced the sign 222 to rotate upwardly about the pivot 218. The pivot 218 is mounted on a strut 220 of the vending machine with which the present coin changer is associated. Thus the sign 222 will be supported by the vending machine but will be actuated by the arm 210 of the lever 208.

When the connecting rod 168 is in its lower position, the detent 176 will not be forced into coin-rejecting position. Similarly, if the detent 184 is secured to the detent 176 rather than to the detent 180, it too will not be forced into coin-rejecting position. However, when the actuator 217 of the vending machine moves the lever 208, all three of the detents will be moved into coin-rejecting position.

The numeral 196 denotes a pivot which is supported by the rear wall of the frame 30 and which extends forwardly from that wall. A lever 198 is pivoted to the pivot 196 intermediate the ends thereof, and the right hand end of the lever 198 is secured to the upper end of the connecting rod 168 by a pin 200. This pin will permit relative rotation of the lever 198 and the connecting rod 168. A vertically-directed slot 202 is provided in the left hand side wall of the frame 30, and that slot accommodates the left hand end of the lever 198. A sign 204 is disposed in register with the left hand end of the lever 198, and that sign will be moved about a pivot 205. The pivot 205 will be supported by a strut 207 of the vending machine with which the coin changer will be used. Thus while the pivot 205 and the sign 204 are part of the vending machine, they will be actuated by the lever 198 of the coin changer.

The coin-intercepting portions 178 of detent 176, 182 of detent 180, and 186 of detent 184 extend into openings in the coin separator 45. Thus, the coin-intercepting portion 178 extends into an opening 226, the coin-intercepting portion 182 extends into an opening 230, and the coin-intercepting portion 186 extends into an opening 228. These openings will be adjacent the passageways for the coins being separated by the coin separator 45 and the introduction of the coin-intercepting portions of the detents will cause the coins to be rejected. These rejected coins will fall to the L-shaped trough 64 and will thus be conducted to the rejected coin chute 58. In the particular modification shown in the drawing, the opening 226 is adjacent the passageway for nickels, the opening 228 is adjacent the passageway for dimes, and the opening 230 is adjacent the passageway for quarters. Thus, the detent 176 can reject nickels, the detent 184 can reject dimes, and the detent 180 can reject quarters.

A payout slide which is denoted by the numeral 232 is disposed immediately below the horizontally-disposed plate 140. The slide 232 has an opening 234 therein, and that opening is elliptical. The short axis of that opening is just slightly longer than the interior diameter of the coin reservoir 150, and the long axis of that opening is slightly longer than the outside diameter of the coin reservoir 150. This dimensioning of the opening 234 avoids any problems which might arise due to a lack of absolute registry of the opening 234 with the opening 144 in the plate 140. As a result, precise machined fits are not required in the coin changer of the present invention.

Two elongated ridges 236 are formed on the slide 232, and those ridges extend longitudinally of that slide. These ridges will bear against the under surface of the plate 140 and will reduce the drag and friction between the slide 232 and that plate. A projection 238 extends upwardly from the rear of the slide 232, and that projection has a rearwardly extending overhang. This overhang will avoid accidental separation of the projection 238 from the element which moves that projection and the slide 232 on which that projection is mounted. A short pin 240 extends upwardly from the upper surface of the slide 232, and that pin is adjacent the rear edge of the slide 232. A slot 242 is provided in the slide 232, and that slot extends inwardly from the rear edge of the slide 232. The projection 238 and the pin 240 on the slide 232 extend upwardly through an opening 244 in the plate 140. This opening is generally rectangular and it permits the slide 232 to reciprocate relative to the plate 140.

The numeral 246 denotes a second payout slide and that slide has friction-reducing ridges 247 thereon. These ridges extend longitudinally of the slide 246, and they will bear against the under surface of the slide 232. The friction-reducing ridges 236 will be out of register with the friction-reducing ridges 247, and thereby any detrimental interaction between those ridges is avoided. In one particular embodiment of the present invention the ridges of the slide 232 are closely adjacent the side edges of that slide while the ridges 247 of the slide 246 are closer to the longitudinal center line of that slide.

A coin-receiving opening 248 is formed in the slide 246, and that opening is elliptical in configuration. The opening 248 is substantially the same size as the opening 234 in the payout slide 232, and its axes are oriented with the axes of the opening 234. Downwardly extending lugs 250 are provided at three points around the periphery of the opening 248, and those lugs have a depth equivalent to a predetermined number of coins stacked one above the other. The lugs 250 will confine stacked coins in the opening 248 and in the area immediately below that opening and will force those lugs to move with the slide 246. An L-shaped projection 257 extends downwardly from the rear edge of the opening 248, and the leg of that projection extends under and underlies the rear part of the opening 248. The vertical portion of the L-shaped projection 257 will coact with the lugs 250 to confine the stacked coins, and the leg of that projection will cause coins that are introduced into the area defined by the lugs 250 to assume a position parallel to the slide 246. The lugs 250 and the L-shaped projection 257 are, in effect, part of the opening 248 and they are so regarded herein.

A projection 252, which is similar to the projection 238, extends upwardly from the slide 246. This projection has a rearwardly extending overhang which will coact with that projection to prevent accidental separation of that projection from the element which pushes it and the slide 246. When the slides 232 and 246 are in register with each other, the projections 238 and 252 will be in register with each other.

A slot 253 is formed in the horizontally-disposed wall 140, and a projection 255 which extends upwardly from the slide 246 is disposed in that slot. This slot permits reciprocation of the projection 255 and the slide 246 relative to the plate 140. That reciprocation is also facilitated by the positioning of the projection 252 in the area defined by the opening 244 in the plate 140. A pin 254 extends upwardly from the rear of the slide 246, and that pin is in register with the slot 242 of the slide 232. When the slide 246 is moved to the left, as that slide is viewed in Fig. 9, the pin 254 will engage the left hand end of the slot 242 and will force the slide 232 to move with the slide 246. However, the slot 242 will permit movement of the slide 232 away from the slide 246 when independent movement of the slides is desired. A pad 256 of cushioning material, as for example, rubber or synthetic rubber, is secured to the under side of the wall 140. This pad of cushioning material is in register with the rear edge of the slide 246, and it will cushion the return stroke of that slide.

A horizontally disposed wall 258 is mounted below the bottom slide 246, and the wall 258 will be immediately below the level of the bottom of the lugs 250 and the L-shaped projection 257 on the slide 246. Such an arrangement will permit free movement of the slide 246 but will also enable the wall 258 to provide support for the coins confined and guided by the lugs 250 and the projection 257. A discharge opening 260 is provided in the wall 258, and that opening is spaced laterally from the opening 144 in the plate 140. The opening 260 is similar to the openings 234 and 248 of the slides 232 and 246, respectively, but it has a longer short axis and it has a longer long axis. Thus the opening in the wall 140, which is denoted by the numeral 144, is the smallest of the openings 234, 248 and 260, while the discharge opening 260 is the largest of that group of openings. This assures full and free release of coins moved into register with that opening.

The numeral 262 denotes sleeves that are provided with shoulders. The shoulders of those sleeves abut the horizontal wall 258 and the small diameter portions of those sleeves abut the bottom of the plate 140. The upper faces of the shoulders of the sleeves 262 will underlie and support the bottom slide 246. The upper portions of those sleeves will abut and guide the side edges of the slide 232 and 246. Suitable screws will extend through the sleeves 262 and seat in the wall 140. The heads of those screws will underlie the wall 258 and hold it fixedly in position relative to the plate 140.

A helical extension spring 264 extends between the pin 240 on the slide 232 and an opening at the right hand end of the wall 140. A similar helical extension spring 266 extends from the pin 254 of the slide 246 to a second opening in the right hand end of the plate 140. These springs bias the slides 232 and 246 into register with the discharge opening 260 and away from the opening 144 in the plate 140. However, those springs will yield to permit movement of the slides 232 and 246 to the left, as those slides are viewed in Fig. 9, to place the openings 234 and 248 thereof in register with the opening 144. The cushioning pad 256 is mounted so it will restrict movement of the slides to the right, as those slides are viewed in Fig. 9. The projection 255 coacts with the slot 253 to assist in this restriction of movement of those slides.

A portion of the plate 140 is bent upwardly to form an ear 268 which is close to and lies parallel with the upper surface of the plate 140. A stop 270 is provided with a slot, and that stop is mounted adjacent the ear 268. A screw 272 extends through the slot in the stop 270 and seats in the plate 140. Tightening of the screw 272 will fix the stop 270 relative to the plate 140, but loosening of that screw will permit the stop 270 to be adjusted relative to that plate. The stop 270 can be extended into the path of the projection 238 on the slide 232, and at such time it will hold the opening 234 of the slide 232 in register with the opening 144 in the plate 140. This will, in effect, make the portion of slide 232 which defines the opening 234 an extension of the coin reservoir 150. When the stop 270 is in the path of movement of the projection 238 on the slide 232, the ear 268 will back up the stop 270 and enable it to overcome the force of the spring 264.

A pivot bracket 274 is mounted on the plate 140 adjacent the opening 244. This bracket will be closely adjacent but will be out of the path of movement of the projection 238 on the slide 232. One of the screws which extends through a sleeve 262 will seat in the bottom of the bracket 274, and another screw will extend through the plate 140 and seat in the bottom of that bracket. These screws will hold the pivot bracket 274 rigid with respect to the plate 140. A pivot 276 is carried by a rocker arm 278, and that pivot extends into and is confined and guided by the pivot bracket 274. One end of the rocker arm 278 underlies a stop 280 which is bent out of the right hand side wall of the frame 30. This stop will limit rotation of the rocker arm 278 in a counter clockwise direction about the pivot 276. The other end of the rocker arm 278 has a pin 282 therein, and that pin secures the rocker arm 278 to a vertically directed connecting rod 284. That connecting rod has a horizontally-directed offset close to the bottom thereof, and that rod extends vertically upwardly from that offset to a point adjacent the vertical midpoint of the coin changer. A second pivot bracket 286 is mounted on the plate 140 adjacent the path of movement of the projection 252 of the slide 246. One of the screws which extends through one of the sleeves 262 seats in the bottom of the pivot bracket 286. Another screw extends through the plate 140 and seats in the bottom of that pivot bracket. These screws hold the bracket 286 fixed relative to the plate 140. A rocker arm 290 has a pivot 288 which is confined and guided by the pivot bracket 286. One end of the rocker arm 290 underlies the stop 280 which is formed in the right hand side wall of the frame 30, and the other end of that rocker arm carries a pin 292. The pin 292 secures the rocker arm 290 to a connecting rod 294. This connecting rod has a horizontally-directed offset adjacent the lower end thereof, and that rod extends vertically upwardly from that offset to a point adjacent the vertical midpoint of the coin changer. The horizontally-directed offset in the connecting rod 294 is disposed below the level of the horizontally-directed offset in the connecting rod 284. This is necessary to permit movement of one of those rods relative to the other.

The numeral 296 denotes a plate which covers the central area of the front of the frame 30. An opening 298 is provided in the plate 296 to receive the inclined portion 84 of the plate 78. That inclined portion 84 extends a short distance through the opening 298.

An opening is provided in the plate 296 adjacent the upper left hand corner of that plate, and an opening is formed in the rear wall of the frame 30 in register with that opening. These openings support the pivot 300 which takes the form of an elongated rod, as shown particularly in Fig. 24. A lever 302 which has two arms thereon that are approximately parallel to each other but are perpendicular to the pivot 300 is mounted for rotation about that pivot. The two arms of the lever have openings which telescope over the pivot 300. The two arms of the lever 302 are connected by a horizontally-directed section which makes the lever 302 U-shaped in end view. A lever 304 has two arms that are approximately parallel to each other and that are perpendicular to the pivot 300. The arms of the lever 304 are connected by a horizontally-directed portion so that lever has the configuration of an inverted U in end view. The arms of the lever 304 have openings therein which can telescope over the pivot 300. A pin 308 connects one of the arms of the lever 304 with the upper end of the connecting rod 294. As a result, rotation of the rocker arm 290 about the pivot 288 will cause rotation of the lever 304 about the pivot 300. Another pin, not shown, connects the upper end of the connecting rod 284 with the lever 302. That pin will be similar to the pin 308. Consequently, rotation of the rocker arm 278 about the pivot 276 will cause rotation of the lever 302 about the pivot 300.

A lever 310 is pivoted about the shaft or pivot 300, and that lever has two arms which are perpendicular to each other and are perpendicular to the pivot 300. The arms of the lever 310 are spaced apart along the length of the pivot 300, and one of those arms is horizontally directed while the other of those arms is vertically directed. A lever 312 is mounted for rotation about the pivot 300, and that lever has two arms that are perpendicular to each other and are perpendicular to the pivot 300. Those arms of lever 312 are spaced apart longitudinally of the pivot 300 and one of those arms is vertically directed while the other of those arms is horizontally directed.

A stop 314 is formed by bending a portion of the rear wall of the frame 30 forwardly from the plane of that wall. The vertically-directed arm of the lever 310 is disposed to the right of the stop 314, as that lever and stop are viewed in Fig. 16, and yet that arm is disposed to the left of the ear 130 on the dog 128. The action of the spring, which is immediately behind the spring 136, is to rotate the ear 130 against the vertically-directed arm of the lever 310 and force that arm against the stop 314. However, that spring can yield to permit movement of the lever 310 in a counter clockwise direction. A stop 316 is formed by bending a portion of the rear wall of the frame 30 forwardly of the plane of that wall. This stop receives one side of the vertically-directed arm of the lever 312, and the other side of that vertically directed arm of the lever 312 will receive the ear 124 on the dog 122. The dog 122 will normally respond to the spring 136 to rotate toward the vertically-directed arm of the lever 312 but that dog can be moved by the lever 312; the spring 136 yielding to permit that movement.

An L-shaped latch 318 is secured to the rear wall of the frame 30 by a screw 320. The vertically-directed leg of the latch 318 will parallel and be closely adjacent to the rear wall of the frame 30, and the horizontally-directed portion of the latch 318 will extend forwardly from that rear wall. The horizontally-directed portion of the latch 318 can overlie and engage the lever 310, and when it does so will hold that lever away from the stop 314. In this position of the lever 310, the dog 128 is rotated in a clockwise direction and the lower end of that dog is spaced to the left of the position shown in Fig. 16. Where desired, the latch 318 may be secured in the position shown in Fig. 16 where it is out of register with the lever 310.

The numeral 322 denotes the coin carrier of the coin changer provided by the present invention. This coin carrier may be fabricated as a unit, but for simplicity of manufacture it is preferably made in two parts. One part is a die casting and it has a number of partitions which define the coin-receiving recesses of that coin carrier. The other part of the coin carrier is a generally U-shaped outer shell which receives and holds the die cast part. The two parts of the coin carrier coact to define a recess 324, a recess 326, a recess 328 and a recess 330. In one preferred embodiment of the present invention the recess 324 receives pennies, the recess 326 receives nickels, the recess 328 receives dimes, and the recess 330 receives quarters. The bottom of recess 324 is completely open, as indicated particularly in Figs. 15 and 16. The bottom of the recess 326 is completely open as emphasized particularly in Fig. 17. The rear section of the bottom of the recess 328 is open but the rest of that bottom is closed, as emphasized particularly in Figs. 12 and 13. The rear portion of the bottom of the recess 330 is open but the front portion of the bottom of that recess is closed as emphasized patricularly in Figs. 19 and 20. The recesses are just slightly wider than the coins which they are to receive are thick, but they are narrower than the width of two such coins. This is important since it avoids a jamming of the coins within the recesses in side-by-side relation. The recesses are long and the recesses 324 and 326 can accommodate two coins in tandem. The coin carrier is substantially as tall as a quarter, and is thus taller than a nickel, penny or dime, and it can give full and adequate support to the various coins held therein.

A generally rectangular notch 332 is formed in the inner wall of the recess 324. A corresponding notch is formed in one wall of the recess 326. The notch 332 receives a projecting pin at the center of a dummy penny 333 which is shown particularly in Fig. 15. The notch is considerably wider than the pin of the dummy penny 333 so that the dummy penny can move back and forth in the recess 324 an appreciable distance. The notch 334 receives the pin of a dummy nickel 335 which is shown particularly in Fig. 17. The notch 334 is considerably wider than the pin of the dummy nickel 335 so that the dummy nickel can move back and forth in the recess 326 appreciable distances.

A groove 336 is provided in the rear wall of the coin carrier 322. This groove extends across the full width of the rear surface of that coin carrier. An opening 338 is provided in the rear wall of the coin carrier 322 and in the die cast part of that coin carrier. A screw 339 extends through the outer opening 338 and seats in the inner opening in the die cast part. This screw will coact with the openings 340 at the front of the two parts of the coin carrier 322, and with the screws 346 that are seated in those openings, to maintain the two parts of the coin carrier 322 in assembled relation. A notch 342 in the outer part of the coin carrier 322 coacts with a lug 344 on the die cast portion of that coin carrier to assure positive orientation of the two parts of that coin carrier. Once the two parts of the coin carrier 322 have been assembled and secured together by the screws 339 and 346, that coin carrier moves and is the equivalent of a unitary structure.

A ledge 348 is formed by bending a part of the front plate 296 rearwardly toward the rear wall of the frame 30. This ledge will be substantially horizontal and it will underlie the front side of the coin carrier 322. The ledge 348 is dimensioned so the inner edge of that ledge will not obstruct the open bottom of the recess 324 of the coin carrier 322. Instead, the inner edge of that ledge will merely underlie the front wall of the U-shaped part of the coin carrier 322.

A shaft 350 is mounted in registered openings in the front plate 296 and the rear wall of the frame 30. This shaft has a yoke 352 rigidly mounted thereon. The upper portions of the arms of the yoke 352 fit on opposite sides of the coin carrier 322, and the upper ends of those arms receive the screws 346 which extend into the opening 340 of that coin carrier. Rotation of the shaft 350 will cause rotation of the yoke 352 and will thus cause translation of the coin carrier 322. The yoke is set so its two positions are on opposite sides of a vertical line passing through the axis of the shaft 350. Consequently, rotation of the shaft 350 will not cause much of a vertical displacement of the left hand end of the coin carrier 322, but instead will cause dominant horizontal movement of that coin carrier.

A cam 354 is mounted on the shaft 350 immediately adjacent the yoke 352. This cam will engage and move the pin 102 on the lever 98. However, that cam can rotate about the pivot 350 relative to the yoke 352, and a spring 356 is provided to resist that rotation. A pin 357 is mounted on the cam 354 adjacent the shaft 350, and that pin extends through an elongated opening, not shown, in the yoke 352, all as indicated particularly in Fig. 20. The spring 356 is wound around the shaft 350, and one end thereof bears against the yoke 352 while the other end thereof bears against the pin 357. This spring will be very stiff and will force the cam 354 to move with the yoke 352 under almost all circumstances as though it were a unitary part of that yoke. However, if the pin 102 on the lever 98 is unable to move, because of a jamming of a coin in the open bottom of the passageway defined by the plate 78 and the trough 76, the spring 356 will yield and prevent breakage. This provision of a yieldable element between the yoke 352 and the lever 98 is important in avoiding damage to the coin changer.

A rod 358 is held by the two arms of the yoke 352 at a point spaced from the shaft 350. A sleeve 360 is telescoped over the rod 358 and it will rotate relative to that rod. The sleeve 360 is an anti-friction sleeve which can transmit forces to the yoke 352 with a minimum of friction and wear. A loop 362 is bent out of the right hand side wall of the frame 30, and a helical extension spring has one end thereof extending through that loop. The other end of that extension spring is held in an opening 353 in the yoke 352. This spring 364 will bias the yoke 352 to the position shown in Fig. 3. In this position, the yoke 352 will hold the coin carrier 322 under and in register with the discharge passageways of the coin separator 45. The alignment of the coin passageways of the separator 45 with the recesses of the coin carrier 322 is shown particularly in Fig. 2.

The numeral 366 denotes the driving shaft of the coin changer provided by the present invention. The rear end of that shaft is supported by a bushing 368 mounted on the rear wall of the frame 30, and the front end of that shaft is mounted in a bushing 370 supported by the front plate 296 of the coin changer. A slotted cam 372 is rigidly secured to and carried by the shaft 366, and the slot in that cam is denoted by the numeral 374. That slot accommodates the sleeve 360 which telescopes over the rod 358 of the yoke 352. As a result, rotation of the driving shaft 366 will force movement of the yoke 352 because of the interaction between the slot 374 in the cam 372 and the sleeve 360 carried by that yoke. The initial position of the yoke 352 and of the cam 372 is shown particularly in Fig. 3 while the moved position of the yoke 352 and of the cam 372 is shown particularly in Fig. 18. In that initial position of the yoke and cam, the sleeve 360 will be adjacent the inner end of the slot 374. In the moved position of the yoke and cam, the sleeve 360 will have moved out of the slot 374 and will be in engagement with a rounded portion of the outer periphery of the cam 372.

A detent or trip 376, in the form of a pin, is carried by the cam 372. This pin is disposed in a counter clockwise direction from the slot 374.

A ratchet 378 with coarse teeth is fixedly secured to and carried by the shaft 366. That ratchet is spaced a short distance forwardly of the rear wall of the frame 30, as indicated particularly in Fig. 4. The ratchet 378 carries a latching surface 380 thereon and that latching surface defines a path of movement which is in register with the dogs 122 and 128, as indicated particularly in Fig. 16. The latching surface 380 will normally be spaced a short distance from the dogs 122 and 128 to permit limited rotation of the driving shaft 366, but the full actuation of the coin changer requires movement of the dogs 122 and 128 out of the path of movement of the latching surface 380. A helical spring 382 is wound around the driving shaft 366 and one end of that spring is secured to the rear wall of the frame 30 while the other end of that frame is secured to the ratchet 378. This spring biases the driving shaft 366 for rotation in a counter clockwise direction, but it will yield to permit rotation of that shaft in a clockwise direction. Rotation of the shaft 366 in the counter clockwise direction will be limited by the engagement between a pin 392 carried by the ratchet 378 and one end of an arcuate slot 396 in the rear wall of the frame 30. The engagement between the pin 392 and the slot 396 is direct and immediate, and it provides ample resistance to the counter clockwise rotation of the shaft 366. The slot 396 is long enough to permit full actuation of the coin changer, as by rotation of the driving shaft 366 in a clockwise direction.

A pawl 386 is secured to a pivot 384 which is mounted on the rear wall of the frame 30. The pawl 386 is in the path of the coarse teeth on the ratchet 378 and it can be moved in either direction by those teeth. A spring 388 has one end secured to the pawl 386 and has its other end secured to a loop 389 which is formed in the right hand side wall of the frame 30. The coarse teeth of the ratchet 378 terminate rather abruptly and enable the pawl 386 to slip past the ends of those teeth and permit return movement of the ratchet. The pawl will coact with the teeth of the ratchet to provide uni-directional movement of the ratchet 378 in either direction and yet will permit that direction of movement to be reversed once the ratchet has moved out of engagement with that pawl.

A pin 390 is secured to the ratchet 378 at a point to the left of the pin 392, as those pins are viewed in Fig. 15. A pin 394 is secured to the ratchet 378 to the right of the pin 392 as those pins are viewed in Fig. 15. These three pins constitute the equivalent of an arcuate ledge or plate carried by the ratchet 378, and such a ledge or plate could be substituted for the pins 390, 392 and 394.

A pivot 398 is mounted on the front plate 296 of the frame 30, and that pivot supports a driving lever 400. The driving lever 400 has an offset intermediate the ends thereof. The offset is inclined rather than being horizontally directed, and it disposes the lower end of the driving lever somewhat further toward the rear of the frame 30 than is the upper part of that lever. A pin 402 is mounted on the upper end of the driving lever 400, and that pin has a sleeve which rolls against the exterior of the cam 372. Thus, rotation of the shaft 366 will cause movement of the driving lever 400.

A number of fine ratchet teeth 404 are provided at the upper end of the driving lever 400. These ratchet teeth are engaged by an L-shaped pawl 422 which is rotatable about a pivot 420 carried by the front plate 296. A spring 424 is secured to the pawl 422 and to the front plate 296, and that spring biases the pawl 422 for rotation in a counterclockwise direction as that pawl is viewed in Fig. 3. The L-shaped pawl 422 has a pointed nose at the junction of the arms of that pawl, and that pointed nose engages the pin 376 on the cam 372. In the normal position of the cam 372 and of the pawl 422, the pin 376 engages the pointed nose of that pawl and holds that pawl out of engagement with the fine ratchet teeth 404 on the driving lever 400.

The lower end of the driving lever 400 is provided with a pivot 406. This pivot supports an actuator which has a horizontally directed portion that can be moved into the path of the projection 238 on the payout slide 232. That horizontally directed portion of the actuator 408 underlies the rocker arm 278 and can be moved down into the path of the projection 238 by rotation of that rocker arm. Normally, a spring 414 will act upon the actuator 408 to hold that actuator up out of the path of the projection 238 on the slide 232. The spring 414 has one end extending through an eye in the actuator 408 and has the other end thereof extending through an eye, not shown, in a projection 412 on the driving lever 400. A second actuator 410 is secured to the driving lever 400 by the pivot 406, and this second actuator also has a horizontally directed portion. That horizontally directed portion is movable into the path of the projection 252 of the slide 246 by rotation of the rocker arm 290. Normally, the spring 416 will hold the actuator 410 up out of the path of the projection 252. One end of the spring 416 will extend into an eye of the actuator 410 and the other end of that spring will extend into an eye on the projection 412 on the driving lever 400. When the horizontally directed portions of the actuators 408 and 410 engage the projections 238 and 252 respectively of the slides 232 and 246, the overhangs of the projections 238 and 252 will overlie those horizontally directed portions of those actuators. The overhangs will prevent accidental separation of the actuators 408 and 410 from the projections 238 and 252.

A projection 418 is formed on the driving lever 400, and that projection extends rearwardly from the plane of that lever. This projection is confined for movement into register with the L-shaped lever 164. Consequently, rotation of the driving lever 400 will force the inclined right hand face of the lever 164 to move upwardly and rotate that lever about the pivot 158.

The numeral 426 denotes a loop that is formed out of the right hand side wall of the frame 30. A helical extension spring 428 has one end thereof extending into the loop 426. The other end of the spring 428 extends into an opening in the lower end of the driving lever 400. This spring biases the lever 400 for rotation in a counterclockwise direction to the position shown particularly in Fig. 3. However, that spring will yield to permit rotation of the driving lever 400 in a clockwise direction to the position shown in Fig. 13.

A handle 430 is provided for the outer end of the driving shaft 366. This handle will be provided with a yielding clutch of standard design and construction to prevent the application of damaging forces to the shaft 366. Splines 432 are provided on the rear end of the shaft 366, and those splines will mesh with internal splines on a connecting shaft 434. The connecting shaft will extend to the vending machine mechanism and will enable rotation of the handle 430 to actuate the vending machine as well as the coin changer.

The numeral 436 denotes a horizontally disposed plate with a vertically directed flange at the front and rear thereof. The rear flange extends upwardly and is secured to the rear wall of the frame 30 while the flange at the front of the plate 436 extends downwardly and is secured to the front plate 296. The plate 436 is set closely adjacent the top of the coin carrier 322 and it will help confine coins within the recesses of that coin carrier. In addition, that plate will be below the center line of coins which are held within the passageways of the coin separator 45 and which cannot enter the recesses of the coin carrier 322 because those recesses are already occupied by coins. As a result, when the coin carrier is moved relative to the plate 436, the smoothly rounded lower portions of the peripheries of those coins will be raised upwardly by that plate and thus the coins will remain in the coin passageways of the coin separator 45. In the absence of this lifting action, the movement of the coin carrier relative to the coin separator might cause jamming of the additional coins which are within the passageways of the coin separator and are resting on the coins in the recesses of the coin carrier. The plate 436 is not of uniform width; instead it is stepped along its right hand edge to accommodate the differing diameters of the coins passing downwardly into the recesses of the coin carrier. As indicated particularly in Fig. 15 the plate 436 is wide where it is adjacent the recess 324 for the penny. As indicated particularly in Fig. 17, that plate is narrower where it is in register with the recess 326 for the nickel. As indicated particularly in Fig. 19, the plate 436 is very narrow where it is in register with the recess 330 for quarters. The stepping back of the right hand edge of the plate 436 will be no greater than necessary and thus the right hand edge of the plate 436 will be contacted by the additional coins almost as soon as the coin carrier 322 begins to move.

A pivot 438 is mounted on the right hand side wall of the frame 30, and that pivot supports a coin-supporting element in the form of a bent wire 440. The wire has a horizontally directed portion which extends into the groove 336 in the rear of the coin carrier 322. That horizontal portion of the wire 440 is spaced from the pivot 438 by a radially-extending portion. The wire 440 has a bent end which extends upwardly and outwardly from the pivot 438, and a leaf spring 442 bears against that bent end. The leaf spring biases the bent wire 440 for rotation in a clockwise direction about the pivot 438, but it will yield to permit movement of the bent wire to the position shown in Fig. 6 whenever the coin carrier 322 is in its initial position. As soon as the coin carrier moves to the left, the horizontally directed portion of the wire 440 will follow along behind the coin carrier 322 until the bent upper end of the wire 440 engages the right hand side wall of the frame 30. At this time the horizontally direction portion of the wire 440 will be spaced from the right hand side wall of the frame 30 and will underlie and be in register with the coin passageways of the coin separator 45. That wire will thus hold additional coins in that passageway. As the coin carrier returns to its initial position it will engage the horizontal portion of the wire 440 and move it back to the position shown in Fig. 6. In that position, the wire 440 fits neatly within the groove 336 in the coin carrier 322.

A pivot 444 is mounted on the rear wall of the frame 30, and a lever 446 is mounted for rotation about the pivot 444. The lever 446 has an opening in the lower end thereof and it has an arcuate slot 448 in the upper end thereof. The slot 448 receives a pin 455 on the lower end of a connecting rod 456. This connecting rod has two bends therein and those bends enable the upper end of the connecting rod 456 to be spaced further forward from the rear wall of the frame 30 than is the lower end of that connecting rod. A spring 450 is wound around the pivot 444 and one end of that spring bears against the lever 446 while the other end of that spring bears against the pin 455. The spring 450 is stiff and it will bias the pin 455 to the upper end of the slot 448 in the lever 446. However, that spring can yield and thus a yielding element or connection is provided between the connecting rod 456 and the lever 446.

The upper end of the connecting rod 456 is secured to a lever 454 by a pin 453. The lever 454 rotates about a pivot 452 which is mounted on the rear wall of the frame 30. A spring 457 is secured to the pivot 452 and to the connecting rod 456. This spring biases the connecting rod 456 for movement upwardly and thus biases the lever 454 for rotation in a clockwise direction about the pivot 452. However, that spring will yield to permit counterclockwise rotation of the lever 454 and downward movement of the connecting rod 456.

A pivot 458 is provided on the rear wall of the frame 30 of the coin changer. An L-shaped lever 460 is mounted for rotation about the pivot 458. The upper end of the lever 460 has an elongated slot which receives a pin 461 carried by the lever 446. The L-shaped lever 460 has the lower end thereof cut away to form an arcuate face. This arcuate face is complementary to the arc defined by the rotation of the pins 390, 392 and 394 on the ratchet 378. Normally, the lever 460 is adjacent but is out of the path of movement of the pins 390, 392 and 394, but it can be rotated down into position to receive the pin 394, and thereby prevent further rotation of the ratchet 378. Similarly, if the ratchet 378 is moved in a clockwise direction, it will prevent downward movement of the arcuate section of the lever 460. Thus the pins 390, 392 and 394 on the ratchet 378 and the arcuate section of the lever 460 constitute interacting surfaces that permit movement of the ratchet 378 or the lever 460 but do not permit conjoint movement of both for any appreciable distance.

An elongated rod 462 is seated in openings in the left hand and right hand side walls of the frame 30. This rod will extend through downwardly extending flanges on a plate or platform 464. The openings in the flanges of the plate or platform 464 will be large enough to permit free reciprocation of that plate or platform relative to that rod. This plate or platform is disposable beneath the coin carrier 322 and serves as a floor for that coin carrier and the recesses thereof.

An inclined ear 466 is bent upwardly out of the plane of the plate or platform 464, and that ear is adjacent the rear edge of that plate. The inclined ear 466 is in register with the recess 324 which receives pennies and it will direct an inserted penny forwardly toward the front end of that recess. Where two coins must be inserted in the recess 324 to effect raising of the lever 310, the inclined ear 466 assures ready acceptance of both coins by moving the first coin forwardly to make room for the second coin.

Similarly, an inclined ear 468 is provided on the plate 464 in register with the recess 326 that receives nickels. Where two nickels are to be used to raise the lever 312, the inclined ear 468 will cause the first nickel to move forwardly and thus make room for the second nickel.

A projection 470 extends rearwardly from the plate 464 and the end of that projection extends into the opening in the lower end of the lever 446. The projection 470 will coact with the opening in the lower end of the lever 446 to enable that lever to drive the platform or plate 464. The opening in the lever 446 will describe an arcuate path and the projection 470 will have to follow that path. This will mean that there will be a slight lateral tilting of the plate or platform 464 as it reciprocates along the rod 462. However, the lateral tilting is quite limited and it is an easy matter to leave sufficient room for this movement.

The coin changer that is provided by the present invention can be set to respond to a number of different combinations of coins to permit operation of the vending machine with which it is used. For example, that coin changer can be set to respond to a nickel, a dime or a quarter when the sales price of the product being vended is five cents; and that coin changer will pay out one nickel when a dime is deposited and will pay out four nickels when a quarter is deposited. That coin changer can be set to respond to a nickel and a penny, a dime and a penny, or a quarter and a penny when the sales price of the product being vended is six cents; and that coin changer will pay out one nickel when a dime and a penny are deposited and will pay out four nickels when a quarter and a penny are deposited. That coin changer can be set to respond to a nickel and two pennies, a dime and two pennies, or a quarter and two pennies when the sales price of the product being vended is seven cents; and that coin changer will pay out one nickel when a dime and two pennies are deposited and will pay out four nickels when a quarter and two pennies are deposited. That coin changer can be set to respond to a dime, two nickels or a quarter when the sales price of the product being vended is ten cents; and that coin changer will pay out three nickels when a quarter is deposited. That coin changer can be set to respond to a dime and a penny, two nickels and a penny, or a quarter and a penny when the sales price of the product vended is eleven cents; and that coin changer will pay out three nickels when a quarter and one penny are deposited. That coin changer can also be set to respond to a dime and two pennies, two nickels and two pennies, or a quarter and two pennies when the sales price of the product being vended is twelve cents; and that coin changer will pay out three nickels when a quarter and two pennies are inserted. Such a coin changer is extremely versatile.

It is a simple matter to change the setting of the coin changer provided by the present invention; and once a setting has been made it will not vary until a new setting is desired. When the coin changer is to be used with a vending machine that sells its products for five cents, the lever 310 is rotated against the ear 130 of dog 128 until that dog is out of the path of latching surface 380 on ratchet 378, latch 318 is rotated until it overlies lever 310 and holds that lever in rotated position, screw 320 is tightened to secure latch 318 in holding position, plate 436 is removed, a dummy nickel 335 is set in recess 326, and plate 436 is replaced. If the coin changer is to be used with a vending machine that sells its products for six cents, the latch 318 is left in the position shown in the drawing, the plate 436 is removed, a dummy nickel 335 is inserted in recess 326, a dummy penny 333 is inserted in recess 324, and plate 436 is replaced. If it is desired to use the coin changer with a vending machine that sells its products for seven cents, the latch 318 is left in the position shown in the drawing, the plate 436 is removed, a dummy nickel 335 is inserted in recess 326, and plate 436 is replaced. In each of the three foregoing instances, the screws 192 will extend through the openings 194 in detent 180 and will seat in the threaded openings in detent 184 that are in register with the openings 194, whereby the detents 180 and 184 will move as a unit.

When the coin changer is to be used with a vending machine that sells its products for ten cents, eleven cents or twelve cents, the heads of the screws 192 will be disposed in the large openings 190 in detent 180, and the shanks of those screws will extend through the openings 188 of detent 184 and seat in the threaded openings in detent 176 that are in register with the openings 188, whereby the detents 176 and 184 will move as a unit. When the coin changer is to be used with a vending machine that sells its products for ten cents, the lever 310 is rotated against the ear 130 on dog 128 until that dog is out of the path of latching surface 380 on ratchet 378, latch 318 is rotated until it overlies and holds lever 310 in rotated position, and screw 320 is tightened to secure the latch 318 in holding position. When the coin changer is used with a vending machine that sells its products for eleven cents, the latch 318 is left in the position shown in the drawing, plate 436 is removed, a dummy penny 333 is inserted in recess 324, and plate 436 is replaced. When the coin changer is to be used with a vending machine that sells its products for twelve cents, it is only necessary to hold the latch 318 in the position shown in the drawing.

When an operator purchases a vending machine that is equipped with the coin changer of the present invention, the coin reservoir 150 of that coin changer will be empty. The quickest way to introduce a supply of nickels into that reservoir is to initiate a cycle of the coin changer but to stop that cycle after the handle 430 has moved about half way toward the lower limit of its path of travel. At such time, the pawl 386 will engage and hold the ratchet 378 on the driving shaft 366; the projection 418 on the driving lever 400 will have rocked lever 164 out of the slot 156 in reservoir 150; and the slot 374 in the cam 372 will have moved the yoke 352 in a counterclockwise direction and will thus have caused the cam 354 to move out of engagement with the pin 102 on the lever 98. The freeing of pin 102 enabled the spring 108 to rotate the lever 98 and move the closure 92 out of register with the nickel passageway, defined by the plate 78 and the trough 76, and also move the stop 90 into register with that passageway. Thereafter it is a simple matter to introduce nickels into the slot defined by the forwardly inclined portion 84 of the plate 78 and the opening 298 in the front plate 296; and those nickels will slide down the inclined portion 84 of plate 78 into the coin reservoir 150. The nickels will fall to the bottom of that reservoir and will rest upon the imperforate forward end of the slide 232; and those nickels will be allowed to lie flat because the lever 164 is held out of the slot 156 in the reservoir 150. The coin reservoir 150 will hold sixty-three or sixty-four nickels but the operator will usually introduce just sixty nickels in the slot defined by the wall 84 and the opening 298. Thereafter he can rotate the handle 430 and complete the full cycle of the vending machine. This procedure does result in the dispensing of an article from the vending machine, but the operator can re-insert that article in the reservoir of the vending machine. It is also possible to fill the reservoir 150 without cycling the vending machine; and this is done by rotating the handle 430 until the latching surface 380 on the ratchet 378 engages and is held by the bottom surfaces of the dogs 122 and 128. At such time, the slot 374 in the cam 372 will have moved the yoke 352 sufficiently to permit the lever 98 to move the closure 92 out of register with the nickel passageway and to move the stop 90 into register with the lower end of that passageway. However, the driving lever 400 will not have moved sufficiently to cause the projection 418 thereon to rock the lever 164 out of the slot 156 in the reservoir 150. Consequently, to make certain that the lowermost nickels will lie flat, the operator should rock the lever 164 out of the slot 156 in the reservoir 150 while he holds the handle 430 down and inserts the nickels in the slot defined by portion 84 and opening 298. This, of course, is not as easy as the first-mentioned procedure.

Once the reservoir 150 has been filled with nickels, and once the coin changer has been set to assure the collection of the desired sales price, the vending machine and its coin changer are ready to operate. If that sales price is a nickel, a dummy nickel 335 will be disposed in the recess 326 of the coin carrier 322, and the latch 318 will be overlying and holding the lever 310 so its vertically directed arm keeps the dog 128 out of the path of the latching surface 380 on the ratchet 378. At such time the driving shaft 366 can be freed from movement by rotation of lever 312, since rotation of that lever will move the dog 122 out of the path of the latching surface 380. The lever 312 can be rotated directly by the insertion of a nickel, since that nickel will hold the dummy nickel 335 against rearward movement when the coin carrier 322 moves forward. The lever 312 can be rotated indirectly when a dime or quarter is inserted because the horizontally-directed portion of lever 312, that connects the two arms of that lever, is so closely adjacent the levers 302 and 304 that it will be raised upwardly by those levers when a dime or quarter is inserted and the coin carrier 322 is moved forwardly.

More specifically, when a nickel is introduced into the coin slot of the vending machine, that nickel will pass through the coin separator 45 and be tested before it reaches the recess 326 in the coin carrier 322. That nickel will be free to drop into the rear portion of the recess 326 because the sides of the notch 334 will coact with the pin of dummy nickel 335 to hold that dummy nickel adjacent the front of recess 326. Once the nickel has seated itself in that recess, rotation of the handle 430 will cause the slot 374 in the cam 372 to drive the yoke 352 in a counterclockwise direction and thereby force the coin carrier 322 to move to the left. As that coin carrier moves, the dummy nickel 335 will strike the end of the lever 312 and will tend to move toward the rear of the recess 326. However, the deposited nickel will prevent such movement of the dummy nickel 335; and the dummy nickel will therefore force the lever 312 to rotate in a counterclockwise direction. Such rotation will enable the vertically directed arm of that lever to act on the ear 124 of dog 122 and move the bottom surface of that dog out of the path of the latching surface 380 on the ratchet 378. Thereupon, the shaft 366 can be rotated toward the end of its clockwise stroke.

During the very first part of the clockwise movement of the shaft 366, the pin 376 on cam 372 will start to move away from the pointed nose on pawl 422, and the exterior surface of cam 372 will begin to move toward the pin 402 on lever 400. However, until the shaft 366 has rotated the latching surface 380 of ratchet 378 above the level of the bottom surfaces of the dogs 122 and 128, there will be no appreciable movement of the pin 402, and thus lever 400, by the cam 372, and there will be no effective interaction between pawl 422 and any of the five ratchet teeth 404. Once the shaft 366 has moved the latching surface 380 of ratchet 378 above the level of the bottoms of the dogs 122 and 128, the cam 372 will promptly act, through the pin 402, to move the driving lever 400 toward the end of its clockwise stroke. This will quickly bring the projection 418 on lever 400 into engagement with the inclined right hand face of the L-shaped lever 164; thereby rocking the lower end of that lever out of the slot 156 in the coin reservoir 150. This action is desirable because it frees the nickels in the coin reservoir 150 from any sidewise pressure and permits those nickels to rest on the imperforate forward end of slide 232 and on each other.

The configuration of the slot 374, and of the exterior, of cam 372 is such that the driving lever 400 will move the lever 164 out of the reservoir 150 before the coin carrier 322 releases the inserted nickel. In addition, the driving lever 400 will move all the way to the end of its clockwise stroke before the handle 430 has completed one third of its full length of travel.

The movement of the driving lever 400 will not cause movement of either of the payout slides 232 or 246 because the lever 312 is not connected to either of the rocker arms 278 or 290. Those rocker arms will, therefore, remain in their initial horizontal position; and the actuators 408 and 410 will be able to slide along the under faces of those rocker arms and remain above and out of register with the projections 238 and 252 of the coin slides 232 and 246. Accordingly, the insertion of a nickel will enable the vending machine to initiate one of its cycles, but it will not permit the paying out of any change.

As the shaft 366 rotates in its clockwise stroke, the cam 372 and the yoke 352 will move the coin carrier 322 to the left. About the time the shaft 366 reaches the midpoint of its clockwise stroke, the right hand end of the recess 326 in the coin carrier 322 will reach the left hand edge of the platform 464; and thereupon the deposited nickel will be forced down through the bottom of that recess by the lever 312. Both gravity and the spring 136 will urge the lever 312 downwardly against that nickel.

As the nickel leaves the recess 326, it will fall into the nickel passageway and start rolling toward the lower end of that passageway. Because the coin reservoir 150 is full, the lug 104 on lever 98 was unable to enter slot 154 when the yoke 352 moved the cam 354 out of engagement with the pin 102 on lever 98; and therefore the spring 108 was not able to move the closure 92 out of register with the bottom of the nickel passageway. Accordingly, the nickel will roll along the top of the closure 92 and pass through the opening 67 in plate 66 and fall downwardly toward the coin box. However, if the coin reservoir 150 had not been full, the lug 104 could have entered the slot 154 and thus permitted the spring 108 to move the closure 92 out of register with the nickel passageway while simultaneously moving the stop 90 into register with that passageway. Under such circumstances the nickel would fall into the open upper end of the reservoir 150; the stop 90 keeping that nickel from overshooting that open upper end. In passing into the reservoir 150, the nickel would replenish the supply of change for the coin changer.

After the nickel has been released from the recess 326, the shaft 366 will continue to the end of its clockwise stroke. In doing so it will assure full actuation of the vending machine.

While the shaft 366 will continue to rotate in a clockwise direction after the lever 400 has reached the end of its clockwise stroke and the nickel has been released from the recess 326, the clockwise rotation of that shaft is not unlimited. After that shaft has rotated through about one hundred and fifteen degrees, the pin 392 on ratchet 378 will engage and be held by the right hand end of the arcuate slot 396 in the rear wall of the frame 30. Thereafter, further clockwise rotation of shaft 366 will be prevented. The direct and immediate nature of the engagement of pin 392 and slot 396 is desirable since it relieves the coin carrier 322, the yoke 352, the cam 372, and the driving lever 400 of needless stresses.

The movement of the coin carrier 322 to the left will be kept uni-directional by the ratchet 378 and the pawl 386; and the clockwise rotation of the driving lever 400 will be kept uni-directional by the five ratchet teeth 404 and the pawl 422. The uni-directional movement of that carrier and the uni-directional rotation of that lever make certain that the customer can not work the coin carrier and driving lever back and forth until an article of merchandise or some change is paid out while the deposited coins are still held in the coin carrier. Instead, the coin carrier and the driving lever will be forced to move all the way to the ends of their forward strokes before they can begin their return strokes.

There will, of course, be some "play" in the movement of the coin carrier 322 and in the rotation of the driving lever 400 because no ratchet is completely free of "play." However, the "play" in the ratchet 378 is so limited that the customer can not cause the vending machine to dispense merchandise by rocking the handle 430; instead he must move that handle all the way to the end of its forward stroke. The "play" in the ratchet teeth 404 is even more limited because the teeth 404 are finer than the teeth of ratchet 378. Moreover, the lever 400 is not directly coupled to the cam 372; that lever merely having a pin 402 that follows the periphery of that cam. Hence, rocking of that cam will merely move that cam toward and away from the pin 402; and it cannot force the pin 402 and the lever 400 to rock with it. These limitations on "play" are important because they avoid any undesired dispensing of merchandise or change.

The cam 372 and the yoke 352 will force the coin carrier 322 to continue to move to the left until the tooth at the left side of the ratchet 378 passes beyond the pawl 386. Thereupon that pawl will swing free, under the action of spring 388; and the shaft will be free to rotate in a counter clockwise direction to its initial position. The spring 382 will bias that shaft for such rotation. The cam 372 will rotate with the shaft 366, and the spring 364 will cause the yoke 352 to follow the surface of that cam; moving in a clockwise direction as it does so. The spring 428 will urge the pin 402 on lever 400 to follow the surface of the cam 372, but the pawl 422 will remain in engagement with one of the five teeth 404 on that lever and prevent any such action. Not until the cam 372 has almost reached its initial position will the lever 400 be free to move; that lever being freed at that time by the lifting of pawl 422 through the engagement of pin 376 with the pointed nose of that pawl. As a result the coin carrier 322 will start moving back to its initial position shortly after the shaft 366 starts its return stroke, but the lever 400 will not start its return to its initial position until that shaft has substantially reached its initial position.

The pawl 386 will engage the teeth of the ratchet 378 during the return stroke of the shaft 366. Hence the handle 430 can not be rocked, during its return stroke, to attain the delivery of additional merchandise. The lever 400 can not be acted upon by the cam 372 during the return stroke of that lever, since the cam 372 will be in its initial position before that lever begins its return stroke. Hence undesired amounts of change can not be paid out during the return stroke of the lever 400.

The driving shaft 366 of the coin changer will be connected to the driving shaft of the vending machine by the extension shaft 434. Hence rotation of the shaft 366 will rotate the driving shaft of the vending machine; and that machine will be set to deliver an article of merchandise during a cycle of operation of the coin changer.

It sometimes happens that a customer changes his mind after he has inserted the nickel that is needed to actuate the vending machine. The present invention gives the customer every opportunity to recover those coins in advance of the moment that he actuates the handle 430. Specifically, a push button will be provided at the exterior of the vending machine, and that push button will be able to act upon the lever 454. Downward movement of that push button will cause downward movement of the lever 454 and of the connecting rod 456 which is pinned to that lever. The connecting rod 456 will act through the yielding element, which consists of the spring 450 and the slot 448 and the pin 455, to transmit downwardly directed forces to the lever 446. If the handle 430 is in its initial position, the downward force on the lever 454 will cause the lever 446 to rotate, and will move the platform 464 out from under the coin carrier 322. Thereupon, the deposited nickel will fall downwardly and strike the inclined wall 112 or the inclined lip 116 on that wall. In either event, the nickel will be guided to the returned coin chute and then directed to a point at the exterior of the vending machine where it can be recovered by the customer.

The coin changer of the present invention is protected against those customers who might attempt to initiate a cycle of the vending machine while also trying to secure the return of the deposited nickel. This protection is afforded by the interlocking surfaces on the lever 460 and on the ratchet 378. Specifically, the end face of the lever 460 will move downward into the arcuate path of the pin 394 on the ratchet 378 and thereby limit rotation of the shaft 366 whenever the lever 454 is rotated to free the nickel for movement to the returned coin chute. The pins 390, 392 and 394 will underlie the cutaway surface of the lever 460 and prevent downward movement of that lever whenever the shaft 366 has been rotated to initiate a cycle of the vending machine. No matter how hard the customer presses on the lever 454, through the medium of the push button mounted on the vending machine, he cannot force the lever 460 to move if any of the pins 390, 392 or 394 underlie the cutaway surface of that lever. Moreover that customer can not break the lever 454, connecting rod 456, lever 444 or lever 460 because the spring 450 will yield long before that happens. This yielding of the spring 450 will limit the force applied to lever 460 to the compressive forces exerted by that spring, and those forces can not bend or break any parts of the coin changer. Thus, the coin changer provided by the present invention will enable the customer to effect operation of the vending machine or to secure the return of the nickel he has deposited, but it will not permit simultaneous operation of the vending machine and return of the deposited nickel.

The operation of the coin changer is quite similar where the sales price is six cents and a nickel and a penny are inserted. A dummy penny 333 will be disposed in the recess 324 and the sides of the notch 332 will coact with the pin on that dummy penny to hold that dummy penny adjacent the front of recess 324. Hence the deposited penny will fall into position behind that dummy penny. Similarly the deposited nickel will fall into position behind the dummy nickel 335. Forward movement of the coin carrier, under the initial movement of the handle 430 and the shaft 366, will cause the dummy penny 333 to rotate the lever 310 in a counter clockwise direction while the dummy nickel 335 is rotating the lever 312 in a counter clockwise direction. Thus, both levers 310 and 312 are rotated and those levers will move the dogs 122 and 128 out of the path of the latching surface 380 on ratchet 378. Thereupon the handle 430 can be operated to initiate a cycle of the vending machine. Here, again, the rocker arms 278 and 290 will remain horizontal because there is no connection between the levers 310 and 312 and those rocker arms. Thus, while the driving lever 400 will move through its cycle, the actuators 408 and 410 will not engage the projections 238 and 252 on the slides 232 and 246.

When the sales price is seven cents and when a nickel and two pennies are inserted, the operation of the coin changer will again be similar to the operation when the sales price is five cents and a nickel is inserted. The first inserted penny will enter the recess 324 and will strike the upwardly inclined ear 466 on the platform 464. The inclination of this ear will cause that penny to roll forwardly to the front of the recess 324. The second inserted penny will then have a clear space into which it can fall. The inserted nickel will fall into position behind the dummy nickel 335. Rotation of the handle 430 will then drive the dummy nickel 335 into engagement with the lever 312 and will drive the first deposited penny into engagement with the lever 310; and those levers will rotate in a counter clockwise direction. That rotation will force the dogs 122 and 128 to move to ratchet-freeing position and will permit the shaft 366 to initiate a cycle of the vending machine. Again, there will be no actuation of the rocker arms 278 and 290, and therefore there will be no actuation of the slides 232 or 246.

In the event the sales price is a nickel and a dime is deposited, the dime will be tested by the coin separator 45 before it enters the recess 328 in the coin carrier 322. When that dime is seated in that recess, it will be in register with one arm of the lever 302. When the coin carrier 322 is moved, by the rotation of the handle 430, the dime will engage the end of the said arm of lever 302 and force it to rotate in a counter clockwise direction; and this rotation will cause that arm to engage and rotate the lever 312, and will also cause the other arm of lever 302 to lift upwardly on the connecting rod 284. The rotation of lever 312 will move the dog 122 out of the path of the latching surface 380 on ratchet 378, thereby freeing the shaft for rotation; and the upward movement of the connecting rod 284 will cause the rocker arm 278 to rotate in a clockwise direction and force the actuator 408 down into register with the projection 238 on the coin slide 232. Further rotation of the handle 430 will cause the coin carrier 322 to move to the left and will cause the driving lever 400 to move in a clockwise direction; and almost immediately, the actuator 408 will move into engagement with the projection 238. At such time the actuator 408 will be under the overhang at the rear of the projection 238, and that overhang will coact with the horizontally-directed portion of the actuator 408 to prevent accidental separation of that actuator and the projection 238. Continued rotation of the handle 430 will enable the driving lever 400 to move the slide 232 to the left until the opening 234 is in register with the opening 144 in the horizontally-disposed plate 140. This movement is prompt and immediate; and the opening 234 will remain in register with the opening 144 until the cycle of the coin changer is almost completed. This gives the lowermost nickel in the reservoir 150 ample time to move down into the opening 234 in the slide 232. The coin carrier 322 will be moving to the left as the driving lever 400 is moving the slide 232 to the left; and before the handle has completed its forward stroke, a nickel will be seated in the opening 234 in slide 232 and the coin carrier 322 will have moved the open-bottomed recess 328 beyond the left hand edge of the platform 464. At that time, gravity and the springs 136 and 414 will have caused the lever 302 to force the dime out through the open bottom of recess 328; and that dime will roll along the dime and quarter passageway, defined by the trough 76, to the accepted coin chute.

Once the handle 430 has reached the end of its forward stroke, the customer can release that handle for movement in a counter clockwise direction to its initial position under the action of spring 382. As the handle 430 rotates in this manner, the cam 372 will permit the yoke 352 to respond to the spring 364 to move the coin carrier back to its initial position. The driving lever 400 and the slide 232 will remain in their moved positions until the pin 376 on the cam 372 engages the nose of pawl 422 and raises that pawl out of engagement with the teeth 404 on lever 400. Thereafter the spring 428 will pull the lever 400 to its initial position, and the spring 264 will pull the slide 232 to the right until the inner end of the slot 242 engages the pin 254 on the slide 246. This engagement will halt further movement of the slide 232 to the right; and while the halting of that slide is positive it is, nevertheless, cushioned, because the slide 246 will move slightly to the right as the cushioning pad 256 yields momentarily.

When it was in its moved position, the slide 232 had its opening 234 in register with the opening 144 in plate 140, and this enabled the lowermost nickel in the reservoir 150 to seat in the opening 234. That nickel was then confined by the opening 234 and by the imperforate forward end of the slide 246; that end of that slide serving as the bottom of the opening 234. When the slide 232 again reached its initial position, its opening 234 was in register with the discharge opening 260 in the wall 258; and thereupon that nickel fell downwardly through the discharge opening 260, and thence to a point at the exterior of the vending machine where the customer can take it.

After the lever 302 forced the dime to fall from the recess 328, that lever moved downwardly to its initial position; thereby freeing lever 312 for movement to its initial position and also permitting the rocker arm 278 to return to its horizontal position. The return of that rocker arm to horizontal position did relieve the actuator 408 of the downward force that moved it into register with the projection 238 on slide 232, but that actuator could not move upwardly under the action of spring 314 because the overhang on projection 238 overlaid and confined the horizontal projection on that actuator. Hence the movement of the rocker arm 278 to its initial position did not interfere with the paying out of the nickel as change. Only after the driving lever 400 and the slide 232 have returned to their initial positions will the actuator 408 have moved out from under the overhang on projection 238 and thus be able to return to its initial position.

If the sales price is six cents, and a dime and a penny are inserted, the penny will coact with the dummy penny 333 to rotate the lever 310 and the dime will rotate the lever 302 when the carrier 322 is moved. Thereupon the coin carrier 322 can move to the accepted coin chute and the lever 400 can move the slide 232. After the dime and penny have been accepted, the handle 430 will be returned to its initial position and the slide 232 will pay out a nickel.

If the sales price is seven cents, and a dime and two pennies are inserted; the dime will rotate the lever 302 and the pennies will coact to rotate the lever 310 when the coin carrier 322 is moved. Again, the coin carrier will be freed to move to the accepted coin chute and the lever 400 will move the coin slide 232 to the left after the dime and two pennies have been accepted, the handle 430 will be returned to its initial position and the slide 232 will pay out a nickel as change.

If the sales price is five cents and a quarter is inserted, the quarter will respond to initial movement of the coin carrier 322 to engage and lift one arm of the lever 304. The lifting of that arm of lever 304 will cause the lever 312 to rotate, because the horizontal portion of lever 312 overlies that arm of lever 304; and it will also cause the other arm of lever 304 to lift the connecting rod 294. The lifting of the connecting rod 294 will cause the rocker arm 290 to rotate in a clockwise direction; and such rotation will force the actuator 410 down into register with the projection 252 on the slide 246. Continued rotation of the handle 430 will cause the coin carrier 322 to move toward the accepted coin chute and will cause the driving lever 400 to rotate in a clockwise direction. Since the actuator 410 is in register with the projection 252 on slide 246, the movement of the driving lever 400 will force that actuator into engagement with the portion of projection 252 below the overhang; and the slide 246 will be forced to move to the left. The pin 254 on slide 246 will engage the left hand end of slot 242 in slide 232 and will force the slide 232 to move to the left. This movement will place the openings 234 and 248 of the slides in register with each other and in register with the coin reservoir 150. Thereupon three nickels will pass through the opening 234 in the slide 232 and lodge in the opening 248 in the slide 246, and one coin will pass into, and lodge in the opening 234 in the slide 232. If the stacked height of three nickels does not exactly match the vertical distance from the horizontal portions of the lugs 250 to the upper surface of slide 246, those nickels and the nickel in the opening 234 of slide 232 will not cause any undesirable interaction between those slides. Instead, those slides will receive the four nickels and will hold them in register with the coin reservoir 150 until the pin 376 on the cam 372 engages and lifts the nose of pawl 422. Thereafter the slides 232 and 246 will move to the right until the openings 234 and 248 are in register with the discharge opening 260. At this time the four nickels will fall downwardly through the discharge opening 260 and be conducted to a point at the exterior of the vending machine. The three nickels from the opening 248 in the slide 246 will fall directly through the opening 260, while the single nickel in the opening 234 in slide 232 will first fall through the opening 248 in the slide 246 and will then fall through the discharge opening 260.

When the sales price is six cents, and a quarter and a penny are inserted, the quarter will lift the lever 304 and the penny will coact with the dummy penny 333 to lift the lever 310 when the carrier 322 is moved. This will force the coin carrier 322 for movement to the accepted coin chute, and will enable the lever 400 to move the slides 232 and 246 to the left. After the quarter and penny have been accepted, the slides 232 and 242 will return to their initial position and pay out four nickels.

If the sales price is seven cents, and a quarter and two pennies are inserted, the quarter will lift the lever 304 and the two pennies will coact to lift the lever 310 when the carrier 322 is moved. This will enable the coin carrier 322 to move to the accepted coin chute and will enable the lever 400 to move the slides 232 and 246 to the left. After the quarter and the two pennies have been accepted, the slides 232 and 246 will return to their initial position and pay out four nickels.

If the sales price is ten cents, the dummy nickel 335 will be removed from the recess 326, the latch 318 will be set so it holds the lever 310 out of register with the surface 380 on latch 378, the screws 192 will be set in the openings 188 and 190 to connect detents 176 and 184 as a unit, the slide 232 will be set with its opening 234 in register with the opening 144, and the stop 270 will be moved into register with the projection 238 of slide 232 to hold the openings 232 and 144 in register. Thereafter, the vending machine can be actuated by two nickels, a dime, or a quarter.

When two nickels are inserted in the coin slot of the vending machine, the first nickel will strike the inclined ear 468 on the platform 464, and will be caused to roll forward, thereby leaving room for the second nickel. The second nickel will fall into the recess 326 behind the first nickel; and it will hold that nickel against rearward movement when the coin carrier 322 is forced forwardly by the yoke 352. The forward movement of the coin carrier 322 will enable the first nickel to lift the lever 312 and move the dog 122 out of the path of the latching surface 380, thereby freeing the shaft 366 for a full cycle of operation. As the coin carrier 322 moves forward, the nickels will pass beyond the left hand edge of the platform 464 and will fall into the nickel passageway. If the level of the nickels in the reservoir 150 is above the slot 154, the closure 92 will be underlying the bottom of the nickel passageway; and the two nickels will pass directly to the accepted coin chute. If the level of the nickels in the reservoir 150 is below the slot 154, that closure will be out of register with that bottom; and the two nickels will fall downwardly into the coin reservoir 150.

The lifting of the lever 312 did not move either of the rockers arms 278 or 290 because that lever is not connected to those rocker arms. Consequently, as the driving lever 400 moved to the left, the actuators 408 and 410 remained above, and out of register with, the projections 238 and 252 on the slides 232 and 246. Hence, while the insertion of the two nickels freed the vending machine for a cycle of operation, it did not permit any change to be paid out to the customer.

When a dime is inserted, the dime will respond to movement of the coin carrier 322 to engage one arm of the lever 302 and force that arm upwardly. The upward movement of that one arm will rotate the lever 312, thus freeing the shaft 366 for full rotation; and will cause the other arm of lever 302 to lift upwardly on connecting rod 284. This will rotate the rocker arm 278 in a clockwise direction, and will force the actuator 408 into register with the projection 238 on slide 232. Continued rotation of shaft 430 will move the coin carrier 322 to the accepted coin chute and will move the lever 400 to the end of its clockwise path of rotation. However, that movement of that lever will not move the slide 232; that slide having previously been set and locked in its left hand position. Consequently, the deposit of a dime will free the vending machine for a cycle of operation, but it will not cause a nickel to be paid out even though the rocker arm 284 moved the actuator 408 into register with the projection 238 on slide 232.

If a quarter is inserted, that quarter will lodge in the recess 330 and will respond to movement of the coin carrier 322 to lift the lever 304. This will rotate the lever 312 out of register with the latching surface 380, and will raise the connecting rod 294. Continued movement of the handle 430 will move the coin carrier to the accepted coin chute and will enable the actuator 410 to engage the projection 252 on slide 246 and force that slide to move to the left. While the pin 254 on the slide 246 is in register with the slot 242 of slide 232, the movement of slide 246 will not affect the slide 232 because that slide was previously locked in its left hand position.

When the slide 246 reaches its left hand position, the opening 248 on that slide will be in register with the coin reservoir 150, and the three lowermost nickels will move into, and lodge in, the opening 248. After the quarter has passed from the recess 330 to the dime and quarter passageway, defined by the trough 76, the slide 246 will return to its initial position and place the opening 248 in register with the discharge opening 260. The stacked height of the three nickels will closely approximate the distance from the horizontal portions of lugs 250 to the top of the slide 246; but if that height and that distance are not exactly identical, there will be sufficient "play" in the mounting of the slides 232 and 246 to enable the slide 246 to free itself for movement independently of the slide 232 which is locked against movement. Once the opening 248 of slide 246 is in register with the discharge opening 260, the three nickels in the opening 248 will fall through the opening 260.

If the sales price is eleven cents, the coin changer can respond to the deposit of two nickels and a penny, a dime and a penny, or a quarter and a penny. In each instance the penny will coact with the dummy penny 333 to rotate the lever 310 out of the path of the latching surface whenever the handle 430 is rotated. The two nickels, the dime or the quarter, as the case may be, will rotate the appropriate lever 312, 302, or 304, as specified immediately above. The two nickels and the penny, and the dime and the penny, will effect the cycling of the vending machine but will not cause any nickels to be paid out as change. The quarter and the penny will initiate a cycle of the vending machine and will also cause the changer to pay out three nickels as change.

If the sales price is twelve cents, the coin changer can respond to two nickels and two pennies, a dime and two pennies, or a quarter and two pennies. In each instance the two pennies will coact to rotate the lever 310 out of the path of the latching surface 380 when the handle 430 moves. The two nickels, the dime or the quarter, as the case may be, will rotate the appropriate lever 312, 302 or 304, as specified above. The two nickels and the two pennies, and the dime and two pennies, will effect the cycling of the vending machine but will not cause any nickels to be paid out as change. The quarter and the two pennies will initiate a cycle of the vending machine and will also cause the coin changer to pay out three nickels as change.

The levers 302, 310, 304 and 312 are not fixedly held against movement along the axis of the pivot 300. Instead, those levers can "float"; being limited in their movement along the axis of pivot 300 by their engagement with the walls of the recesses of the coin carrier 322. The "floating" nature of the mounting of these levers is very desirable because it reduces any friction and drag between those levers and the coin carrier.

The ends of the levers 302, 304, 310 and 312 which engage the coins in the recesses 324, 326, 328 and 330 are held above the geometric centers of those coins. As a result, the smoothly rounded upper surfaces of the coins are able to engage and lift those levers. If the ends of those levers were to strike those coins at points below their geometric centers, the levers might be jammed against movement. The ends of the levers 310 and 312 are held above the geometric centers of the pennies and nickels by the engagement of the vertical arms of those levers with the stops 314 and 316; and the ends of the levers 302 and 304 are held above the geometric centers of the dimes and quarters by the interaction of the rocker arms 278 and 290 with the stop 280.

When the sales price is less than ten cents, the payout slide 232 is freed from the stop 270; but when the sales price is ten cents or over, that slide is held by the stop 270 so its opening 234 is in register with the coin reservoir 150. Regardless of its position, the payout slide 232 never varies the size of the discharge opening 260 and never varies the effective thickness of the plate 258. Instead that slide merely becomes, in effect, an extension of the coin reservoir 150, and the nickels that are to be discharged through the opening 260 can fall freely through that opening.

The coins that are to be used to effect the cycling of the vending machine need not be introduced into the coin slot of that vending machine in any particular order or sequence. Regardless of the sequence in which those coins are inserted, they will all be tested by the coin separator 45 before they are directed to the appropriate recesses in the coin carrier 322. If more coins are introduced than are needed to effect a cycle of the vending machine, those coins will not be automatically returned to the customer; and this saves the customer's time and effort. Instead, the bottoms of those additional coins will rest upon the tops of the coins in the recesses of the carrier 322, and the upper portions of those coins will bear against the walls of the passageways in the coin separator 45. When the coin carrier 322 is moved to the left, in a cycle of operation of the coin changer, the additional coins will tend to move with that carrier. However, the forward faces of those coins will quickly strike the plate 436 and be raised upwardly; the coins remaining in the coin passageways of the coin separator 45 but moving upwardly in those passageways. As the coin carrier 322 continues to move to the left, the additional coins will receive less and less support from the coins in the recesses thereof, and when the coin carrier reaches the end of its forward path of movement the additional coins will receive most of their support from the walls of the passageways in the coin separator 45 and from the coin-supporting element 440.

As shown in Figs. 12 and 13, the coin-supporting element 440 is parallel to and abuts the right hand side wall of the frame 30 whenever the coin carrier 322 is in its initial position, but is inclined to and extending outwardly from that wall when the coin carrier 322 is adjacent the accepted coin chute. The lower portion of the element 440 fits in the groove 336 in the carrier 322 and is adjacent the right hand wall of frame 30 when that carrier is adjacent that wall, but that portion of the element 440 is spaced from that groove and from that wall when the carrier is at the end of its forward stroke. At such time, the horizontal portion of the coin-supporting element 440 is under, and in direct registry with, the coin passageways of the coin separator 45. In moving from the position of Fig. 12, the horizontal portion of the coin-supporting element 440 followed an upwardly directed arcuate path; and that path enables that portion of element 440 to ease the coins, in the passageways of coin separator 45, upwardly. The horizontal portion of the element 440 is closely adjacent the top of the coin carrier 322, and thus the transfer of the additional coins from that carrier to that portion of the element 440 is easy; particularly since that portion of that element moves closer to the lever of the top of that carrier when that carrier moves to the left. The transfer of the additional coins from the element 440 to the coin carrier 322 is just as easy; the rear edge of that carrier sliding under those coins while it rotates that element toward the right hand side wall of the frame 30.

As long as the coin reservoir 150 has seven or more nickels in it, and this will usually be the case, the lower end of the L-shaped lever 164 will be kept from entering the slot 156 in the coin reservoir 150. Consequently, that lever will normally be in the position indicated by the dashed line in Fig. 7, and the detents 176, 180 and 184 will normally respond to gravity to move out of, and rearwardly away from, the openings 226, 230 and 228 respectively. When the detents are out of the said openings, the coin separator 45 can accept nickels, dimes and quarters and conduct them to the appropriate recesses in the coin carrier 322. At this time, the connecting rod 168 will hold the lever 198 with its left hand end adjacent the bottom of the slot 202 in the left hand side wall of the frame 30. Wherever the lever 198 is in this position, the sgin 204 will have the notation "USE 5¢ 10¢ 25¢" thereon in register with a suitable aperture in the vending machine. That notation will notify the customer that he can attain the desired goods when he deposits nickels, dimes or quarters. If the sales price is six cents, seven cents, eleven cents or twelve cents, and additional sign will be provided to tell the customer the number of pennies that must be inserted; but this sign will not move with the sign 204.

Whenever the number of nickels in the reservoir 150 is less than seven, the lower end of the L-shaped lever 164 will enter the slot 156; and at that time it will have the position indicated by solid lines in Fig. 7. Thereupon the connecting rod 168 will respond to spring 166 to move downwardly; thus rotating the lever 198 to the position indicated by solid lines in Fig. 7, and forcing the detent 180 to move forwardly and place the coin-intercepting portion 182 thereof in the opening 230. If the detent 184 is secured to the detent 180, the coin-intercepting portion 186 will be placed in the opening 228. In the former instance only quarters will be rejected, and in the latter instance both dimes and quarters will be rejected. Actually, neither dimes nor quarters should be inserted at this time because the lever 198 will have rotated the front part of the sign 204 downwardly to place the notation "USE 5¢ ONLY" thereon in register with the said aperture in the vending machine. Most customers will respond to the latter notation and insert nickels in the coin slot of the vending machine; and these nickels will replenish the supply of change in the coin reservoir 150.

The coin changer will provide immediate notification to the customers when the supply of change is replenished, because the level of the nickels in the coil reservoir 150 is measured during each cycle of the vending machine. This measuring is effected by having the projection 418 on the driving lever 400 engage the inclined face on the horizontal arm of lever 164 and rock that lever out of the slot 156 in the reservoir 150. As the lever 400 moves back to its initial position the projection 418 moves out of engagement with the lever 164 and thereby permits that lever to rotate toward the slot 156; and that lever will act through connecting rod 168 and lever 198 to set the sign 204 so it indicates the status of the level of change.

The withdrawal of the lever 164 from the slot 156 during each cycle of the vending machine is also advantageous since it permits the nickels to turn and lie flat in the reservoir. Moreover, that withdrawal also frees the nickels from any sidewise forces that might keep those nickels from moving all of the way to the bottom of the reservoir 150.

The lower end of the lever 164 and the slot 156 could be set so that the said end of the lever is intercepted by the uppermost nickel of a stack of nickels containing fewer than seven nickels. However, it is advantageous to have that end of lever 164 be intercepted by a nickel above the level of the fifth nickel in the coin reservoir 150; because such an arrangement will enable the coin changer to pay out the full amount of change to a customer who deposits a nickel and a quarter or a nickel and a dime in rapid succession. The detent 180 or the detents 180 and 184 would be moved out of the openings in the coin separator 45 as the projection 418 rocked the lever 164; and a quarter or a dime, that was deposited immediately after that nickel, would not be intercepted by those detents. The seven reserve nickels protect such a customer by assuring a sufficient supply of nickels to make change for him.

In the event the supply of products in the reservoir of the vending machine becomes exhausted, the coin changer will reject any further nickels, dimes and quarters and will indicate that the vending machine is empty. Specifically, the actuator 217, which is a part of and is supported by the vending machine, will move into engagement with the arm 214 on the lever 208 and force that lever forwardly. This will cause the arm 212 of lever 208 to force all of the detents 176, 184 and 180 forwardly into coin-rejecting position, and will force the arm 210 of lever 208 to raise the sign 222 upwardly. In the normal position of the sign 222, the word "EMPTY" is not visible to the customer, but when that sign is raised by the arm 210, that word is visible. In this way the cutomer is made to know that he should not insert further coins in the coin slot of the vending machine.

However, even if a customer should do so, the nickels, dimes and quarters will be rejected atuomatically, and the pennies will be held in or above the recess 324. The customer can retrieve those pennies, and any other coins in the recesses of the coin carrier 322, by actuating the push button associated with the vending machine. Thereupon the platform 464 will move forwardly and let those coins drop to the returned coin chute. In this way the coin changer provides full protection to the customer by indicating that the machine is empty, by returning the nickels, dimes and quarters immediately, and by making it possible for him to secure the return of his pennies as well.

Whereas the drawing and accompanying description have shown and described a preferred embodiment of the present invention, it should be apparent to those skilled in the art that various changes may be made in the form of the invention without affecting the scope thereof.

What I claim is:

1. In a manually operated coin-handling device that has a reservoir for coins, an opening in said reservoir through which coins can pass from said reservoir, a slide with a coin-receiving opening therein that can receive a pre-determined number of coins, a second slide with a coin-receiving opening therein that can receive a greater number of coins, a coin-supporting surface with a discharge opening therein, a manually operated actuator, and a linkage interconnecting said actuator and said slides the improvement which comprises mounting the first said slide for reciprocatory movement adjacent said opening in said reservoir, mounting said second slide for reciprocatory movement adjacent the first said slide with the first said slide intermediate said second slide and said opening in said reservoir, mounting said coin-supporting surface adjacent said second slide with said slides intermediate said coin-supporting surface and said opening in reservoir and with the center of said discharge opening displaced laterally from the center of said opening in said reservoir, springs that bias said slides for movement toward said discharge opening, said opening in said reservoir and said discharge opening in said coin-supporting surface being partially co-extensive, said coin-receiving openings in said slides receiving coins from said opening in said reservoir and transporting said coins to said discharge opening, the first said slide being movable with or independently of said second slide, said coin-supporting surface coacting with said coin-receiving opening in said second slide to hold and confine coins whenever said coin-receiving opening in said second slide is in register with said opening in said reservoir, said linkage including an oscillatable cam that rotates in one direction to move said slides toward said reservoir whenever said slides are to be moved toward said reservoir and to thereafter hold said coin-receiving openings of said slides in register with said opening in said reservoir until said cam reaches the end of its path of rotation in said one direction, said cam being rotatable in the opposite direction to free said slides, said cam having a camming surface that promptly moves said slides toward said reservoir and that thereafter enables said cam to hold said coin-receiving openings of said slides in register with said opening in said reservoir during the rest of said rotation of said cam in said one direction, and a ratchet that permits movement of said slides toward said reservoir and that prevents appreciable reverse movement of said slides while said cam is rotating in said one direction to move said slides toward said reservoir.

2. In a coin-handling device that has a reservoir for coins, an opening in said reservoir through which coins can pass from said reservoir, a slide with a coin-receiving opening therein that can receive a pre-determined number of coins, a second slide with a coin-receiving opening therein that can receive a greater number of coins, and a coin-supporting surface with a discharge opening therein, the improvement which comprises mounting the first said slide for reciprocatory movement adjacent said opening in said reservoir, mounting said second slide for reciprocatory movement adjacent the first said slide with the first said slide intermediate said second slide and said opening in said reservoir, and mounting said coin-supporting surface adjacent said second slide with said slides intermediate said coin-supporting surface and said opening in reservoir and with said discharge opening displaced laterally from said opening in said reservoir, said coin-receiving openings in said slides receiving coins from said opening in said reservoir and transporting said coins to said discharge opening, the first said slide being movable with or independently of said second slide, said first slide and said second slide having interacting surfaces that can force said first slide to move as said second slide moves, said coin-supporting surface coacting with said coin-receiving opening in said second slide to hold and confine coins whenever said coin-receiving opening in said second slide is in register with said opening in said reservoir, and a latch that selectively holds the first said slide fixed relative to said reservoir with the coin-receiving opening of the first said slide in register with said opening in said reservoir, whereby the first said slide can serve as an extension of said reservoir, said latch being spaced from said interacting surfaces whereby said second slide can move independently of said first slide whenever said first slide is held by said latch.

3. In a coin-handling device that has a reservoir for coins, an opening in said reservoir, a slide with a coin-receiving opening therein, a second slide with a coin-receiving opening therein, and a coin-supporting surface with a discharge opening therein, the improvement which comprises mounting said slides for reciprocatory movement relative to said reservoir and relative to said coin-supporting surface and relative to each other whereby said coin-receiving openings can receive coins from said opening in said reservoir and can transfer said coins to said discharge opening, interacting surfaces on said slides that enable said second slide to force the first said slide from a position adjacent said discharge opening to a position adjacent said reservoir, and that permit said first slide to move independently of said second slide whenever said second slide is adjacent said discharge opening, and a latch that can selectively hold the first said slide in register with said reservoir, said latch being spaced from said interacting surfaces to permit movement of said said second slide relative to said reservoir and said coin-supporting surface and the first said slide whenever said first slide is held by said latch.

4. In a manually operated coin-handling device that has a reservoir for coins, an opening in said reservoir, a slide with a coin-receiving opening therein that can accommodate a plurality of stacked coins, a coin-supporting surface with a discharge opening therein, a manually operated actuator, and a linkage that interconnects said actuator and said slides, the improvement which comprises mounting said slide for reciprocatory movement adjacent said opening in said reservoir, mounting said coin-supporting surface adjacent said slide with said discharge opening displaced laterally from said opening in said reservoir, a distance less than the diameter of said coin-receiving opening in said slide, whereby the trailing edge of said coin-receiving opening in said slide will overlie part of said discharge opening when said coin-receiving opening in said slide is in register with said opening in said reservoir, said slide being movable to transfer coins from said opening in said reservoir to said discharge opening, and a coin-holding surface on said slide that is adjacent the trailing edge of said coin-opening in said slide and is at the approximate level of said coin-supporting surface, said coin-holding surface intercepting those edges of the coins, stored in said reservoir, that are adjacent said trailing edge of said coin-receiving opening in said slide and that tilt downwardly toward said discharge opening as said coin-receiving opening approaches said opening in said reservoir, thereby keeping said coins from sliding to and through said discharge opening instead of coming to rest in said coin-receiving opening of said slide, said coin holding surface coacting with said coin-supporting surface to hold said coins parallel to said slide as they lodge in said coin-receiving opening of said slide.

5. In a coin handling device that has a reservoir for coins, an opening in said reservoir through which coins can pass from said reservoir, a slide with a coin-receiving opening therein, a coin-supporting surface with a discharge opening therein, a movable coin carrier, and a driving lever, the improvement which comprises mounting said slide for reciprocatory movement adjacent said opening in reservoir, mounting said coin-supporting surface adjacent said slide with the center of said discharge opening displaced laterally from the center of said opening in said reservoir, an actuator that is carried by said driving lever and is selectively registerable with said slide to move said slide, a handle that is movable to move said coin carrier and to move said driving lever, and a linkage that includes an element which is engageable by a coin of predetermined characteristics within said coin carrier and is movable by said coin to cause said linkage to force said actuator into register with said slide, whereby insertion of a coin of said predetermined characteristics into said coin carrier will coact with handle-induced movement of said coin carrier toward said element of said linkage and with handle-induced movement of said driving lever to positively move said slide.

6. In a coin handling device that has a reservoir for coins, an opening in said reservoir through which coins can pass from said reservoir, a slide with a coin-receiving opening therein, a coin-supporting surface with a discharge opening therein, a movable coin carrier, and a driving lever, the improvement which comprises mounting said slide for reciprocatory movement adjacent said opening in reservoir, mounting said coin-supporting surface adjacent said slide with the center of said discharge opening displaced laterally from the center of said opening in said reservoir, an actuator that is pivoted to said driving lever and is selectively movable into register with said slide, said actuator being biased out of registry with said slide, a handle that is movable to move said coin carrier and to move said driving lever, and a linkage that includes an element which is engageable by a coin of predetermined characteristics within said coin carrier and is movable by said coin to cause said linkage to force said actuator to rote relative to said driving lever and to move into register with said slide, whereby insertion of a coin of said predetermined characteristics into said coin carrier will coact with handle-induced movement of said coin carrier toward said element of said linkage and with handle-induced movement of said driving lever to positively move said slide.

7. In a coin handling device that has a reservoir for coins, an opening in said reservoir through which coins can pass from said reservoir, a slide with a coin-receiving opening therein, a coin-supporting surface with a discharge opening therein, a movable coin carrier, and a driving lever, the improvement which comprises mounting said slide for reciprocatory movement adjacent said opening in reservoir, mounting said coin-supporting surface adjacent said slide with the center of said discharge opening displaced laterally from the center of said opening in said reservoir, an actuator that is pivoted to said driving lever and is selectively movable into register with said slide, a driven surface on said slide that receives and is driven by said actuator and a holding surface on said slide that resists separation of said actuator and said slide during said reciprocatory movement of said slide, a handle that is movable to move in said coin carrier and to move said driving lever, and a linkage that includes an element which is engageable by a coin of predetermined characteristics within said coin carrier and is movable by said coin to cause said linkage to force said actuator into register with said slide, whereby insertion of a coin of said predetermined characteristics into said coin carrier will coact with handle-induced movement of said coin carrier toward said element of said linkage and with handle-induced movement of said driving lever to move said slide.

8. In a manually operated coin handling device that has a reservoir for coins, an opening in said reservoir through which coins can pass from said reservoir, a slide with a coin-receiving opening therein, a coin-supporting surface with a discharge opening therein, a driving lever, and a manually operated handle that is moved to initiate each operation of said device, said driving lever moving in response to said handle during each operation of said device, the improvement which comprises mounting said slide for reciprocatory movement adjacent said opening in said reservoir, mounting said coin-supporting surface adjacent said slide with the center of said discharge opening displaced laterally from the center of said opening in said reservoir, an actuator that is carried by said driving lever and is selectively registerable with said slide to move said slide, and a linkage that responds to a coin of predetermined characteristics to move said actuator into register with said slide, whereby insertion of a coin of said predetermined characteristics will coact with handle-induced movement of said driving lever to move said slide, said linkage including a rocker arm adjacent said actuator and said driving lever, an unlocking lever, and a rod extending between said rocker arm and said unlocking lever, said actuator normally moving independently of said rocker arm and of said slide, said unlocking lever responding to said coin of predetermined characteristics to move said rod and said rocker arm until said actuator is moved into register with said slide, said actuator thereafter moving independently of said rocker arm.

9. In a coin handling device that has a reservoir for coins, an opening in said reservoir through which coins can pass from said reservoir, a slide with a coin-receiving opening therein, a coin-supporting surface with a discharge opening therein, and a driving lever, the improvement which comprises mounting said slide for reciprocatory movement adjacent said opening in said reservoir, mounting said coin-supporting surface adjacent said slide with the center of said discharge opening displaced laterally from the center of said opening in said reservoir, an actuator that is carried by said driving lever and is selectively registerable with said slide to move said slide, and a linkage that responds to a coin of predetermined characteristics to move said actuator into register with said slide, whereby insertion of a coin of said predetermined characteristics will coact with movement of said driving lever to move said slide, said linkage including a rocking lever that is approximately parallel to the path of movement of said slide, said actuator normally moving independently of said rocking lever and of said slide, said rocking lever responding to the insertion of said coin of predetermined characteristics to move said actuator into register with said slide.

10. In a coin-handling device that has a reservoir for coins, an opening in said reservoir through which coins can pass from said reservoir, a slide with a coin-receiving opening therein, a second slide with a coin-receiving opening therein, a coin-supporting surface with a discharge opening therein, and a driving lever, the improvement which comprises mounting said slides intermediate said reservoir and said coin-supporting surface for reciprocatory movement relative to said reservoir and coin-supporting surface and relative to each other, an actuator that is carried by said driving lever and is selectively registerable with the first said slide, a rocking lever that is movable to move said actuator into register with the first said slide, a second actuator that is carried by said driving lever and is selectively registerable with said second slide, and a second rocking lever that is movable to move said second actuator into register with said second slide, the first said rocking lever being on one side of said driving lever and said second rocking lever being on the opposite side of said driving lever, said rocking levers being movable independently of each other to provide independent movement of said actuators.

11. In a coin handling device that has a reservoir for coins, an opening in said reservoir through which coins can pass from said reservoir, a reciprocable slide with a coin-receiving opening therein, a coin-receiving surface with a discharge opening therein, a driving shaft, a cam that is mounted on said driving shaft and is rotatable therewith, and a driving lever that is movable by said cam to move said slide, the improvement which comprises a coarse ratchet mounted on and rotatable with said driving shaft, a ratchet pawl that is adjacent to and is engageable with said coarse ratchet, a fine ratchet on said driving lever, and a second ratchet pawl that is adjacent to and is engageable with said fine ratchet, said cam moving said driving lever to the end of its path of movement before said driving shaft reaches the end of its path of movement, said second ratchet pawl permitting said driving lever to move to said end of its path of movement but thereafter holding said driving lever at said end of its path of movement until said driving shaft reaches the said end of its path of movement, said coarse ratchet and the first said ratchet pawl preventing appreciable bi-directional movement of said cam during a portion of the movement of said slide, said fine ratchet and said second ratchet pawl limiting bi-directional movement of said driving lever during said portion of the movement of said slide to an even smaller degree than said bi-directional movement of said cam is limited.

12. In a coin handling device that has a reservoir for coins, an opening in said reservoir through which coins can pass from said reservoir, a reciprocable slide with a coin-receiving opening therein, a coin-receiving surface with a discharge opening therein, a driving shaft, a cam that is mounted on said driving shaft and is rotatable therewith, and a driving lever that is movable by said cam to move said slide, the improvement which comprises a coarse ratchet mounted on and rotatable with said driving shaft, a ratchet pawl that is adjacent to and is engageable with said coarse ratchet, a fine ratchet on said driving lever, a second ratchet pawl that is adjacent to and is engageable with said fine ratchet, said coarse ratchet and the first said ratchet pawl preventing appreciable bi-directional movement of said cam during a portion of the movement of said slide, said fine ratchet and said second ratchet pawl limiting bi-directional movement of said driving lever during said portion of the movement of said slide to an even smaller degree than said bi-directional movement of said cam is limited, and a trip that is carried by said driving shaft to free said second ratchet pawl from said fine ratchet as said driving shaft returns to its initial position.

13. In a coin handling device which has three spaced passageways for coins, the improvement which comprises three detents, openings in said passageways to receive said detents, at least two of said detents being mounted for movement relative to said passageways and for movement independently of each other and for movement into two of said openings, and securing elements that selectively secure the third detent to one or the other of said two detents whereby said third detent moves conjointly with said one or said other detent, said securing elements being positioned to hold said other detent in register with said other opening when said other detent is secured to one of said two pivotally mounted detents and also when said other detent is secured to the other of said two pivotally mounted detents, said detents being movable into and out of said passageways through said openings to intercept coins or to permit free movement of coins through said passageways.

14. In a coin handling device which has three spaced passageways for coins, the improvement which comprises three detents, at least two of said detents being mounted for movement relative to said passageways and relative to each other, and securing elements that selectively secure the third detent to one or the other of said two detents whereby said third detent moves conjointly with said one or said other detent, said detents being movable into and out of said passageways to intercept coins or to permit free movement of coins through said passageways, said one and said other detents having portions thereof that are registerable with each other, said third detent being selectively securable to said registerable portions of said one or said other detents, said securing elements being threaded elements that selectively extend through openings in said other detent and seat in threaded openings in said third detent or extend through other openings in said third detent and seat in threaded openings in said one detent, said openings in said other detent being out of register with said other openings in said third detent and with said threaded openings in said one detent, said other detent having larger openings in register with said threaded openings in said one detent and with said other openings in said third detent to loosely accommodate the heads of said securing elements.

15. In a coin handling device, a frame, a plurality of walls that are spaced apart to define a plurality of spaced coin-receiving openings, said spaced walls being disposed in predetermined relation to said frame, said frame defining an area above said spaced walls which is adapted to receive a coin separator that has a plurality of discharge openings that are spaced apart in the same manner and at the same distances as said coin-receiving openings are spaced apart, and mounting brackets on said frame that are adapted to releasably hold said coin separator with the said discharge openings thereof adjacent to and in register with said coin-receiving openings, one of said mounting brackets being disposed adjacent the said discharge openings of said coin separator and being adjustable transversely of said coin-receiving openings to place said discharge openings of said coin separator in precise registry with said coin-receiving openings.

16. In a coin handling device, a frame, a plurality of walls that are spaced apart to define a plurality of spaced coin-receiving openings, said spaced walls being disposed in predetermined relation to said frame, said frame defining an area above said spaced walls which is adapted to receive a coin separator that has a plurality of discharge openings that are spaced apart in the same manner and at the same distances as said coin-receiving openings are spaced apart, and mounting brackets on said frame that are adapted to releasably hold said coin separator with the said discharge openings thereof adjacent to and in register with said coin-receiving openings, one of said mounting brackets being disposed adjacent the said discharge openings of said coin separator and being adjustable transversely of said coin-receiving openings to place said discharge openings of said coin separator in precise registry with said coin-receiving openings, said one mounting bracket having a slot therein to receive a projection on said coin separator, another of said mounting brackets being a leaf spring that selectively engages and holds a portion of said coin separator that is spaced from said projection, and a stop that is disposed outwardly of said second mounting bracket to permit said second mounting bracket to bend and free said portion of said coin separator but to prevent the bending of said second mounting bracket beyond its elastic limit.

17. In a coin handling device that has a reservoir for coins, an opening in said reservoir through which coins can pass from said reservoir, a reciprocable slide with a coin-receiving opening therein, a coin-receiving surface with a discharge opening therein, a driving shaft, a cam that is mounted on said driving shaft and is rotatable therewith, and a driving lever that is movable by said cam to move said slide, the improvement which comprises a coarse ratchet mounted on and rotatable with said driving shaft, a ratchet pawl that is adjacent to and is engageable with said coarse ratchet, a fine ratchet on said driving lever, and a second ratchet pawl that is adjacent to and is engageable with said fine ratchet, said coarse ratchet and the first said ratchet pawl preventing appreciable bi-directional movement of said cam during a portion of the movement of said slide, said fine ratchet and said second ratchet pawl limiting bi-directional movement of said driving lever during said portion of the movement of said slide to an even smaller degree than said bi-directional movement of said cam is limited, said cam moving said driving lever to the end of its path of reciprocation before said coarse ratchet reaches the end of its path of reciprocation, said second ratchet pawl permitting said driving lever to move to said end of its path of reciprocation but thereafter holding said driving lever at said end of its path of reciprocation until said coarse ratchet reaches said end of its path of reciprocation.

18. In a coin handling device that has a reservoir for coins, an opening in said reservoir through which coins can enter said reservoir, and a coin passageway that is disposed at one side of said opening and can direct coins to said opening, the improvement which comprises a stop that is spaced beyond said side of said opening and is adjacent the opposite side of said opening and that is selectively movable into and out of register with said coin passageway to intercept coins from said passageway and prevent passage of said coins past said opening, a handle to operate said coin handling device, and a linkage that extends between said stop and said handle, whereby movement of said handle can cause movement of said stop.

19. In a coin handling device that has a reservoir for coins, an opening in said reservoir through which coins can enter said reservoir, and a coin passageway that can direct coins to said opening, the improvement which comprises a closure for said opening that is selectively movable to close said opening, a spring that biases said closure to uncover said opening, and an element that is spaced from said passageway and from said reservoir and that is movable to one position to urge said closure to close said opening and that is movable to a second position to permit said spring to move said closure to uncover said opening, said element moving to said second position during each operation of said device and thereafter moving to said one position, said closure moving to uncover said opening whenever the level of the coins in said reservoir is below a predetermined point but being held against such movement whenever the level of the coins is at or above said point.

20. In a coin handling device that has a reservoir for coins, an opening in said reservoir through which coins can enter said reservoir, and a coin passageway that can direct coins to said opening, the improvement which comprises a closure for said opening that is selectively movable to close said opening and a feeler that is movable with said closure, and an element that is spaced from said passageway and from said reservoir and that is movable to one position to urge said closure to close said opening and that is movable to a second position to permit said closure to uncover said opening, said element moving to said second position during each operation of said device and thereafter moving to said one position, said feeler being adjacent said reservoir and having a portion thereof movable into said reservoir to engage coins in said reservoir, said feeler holding said closure against movement to opening-uncovering position whenever said portion of said feeler engages a coin within said reservoir.

21. In a coin handling device that has a reservoir for coins, an opening in said reservoir through which coins can enter said reservoir, and a coin passageway that is disposed at one side of said opening and can direct coins to said opening, the improvement which comprises a stop that is spaced beyond said side of said opening and is adjacent the opposite side of said opening and that is selectively movable into and out of register with said coin passageway to intercept coins from said passageway and prevent passage of said coins past said opening, and a closure for said opening that is selectively movable to close said opening, said stop being spaced from said closure so said closure leaves said opening uncovered whenever said stop is in register with said coin passageway and so said stop is out of register with said coin passageway whenever said closure closes said opening.

22. In a coin handling device that has a reservoir for coins, an opening in said reservoir through which coins can enter said reservoir, and a coin passageway that is disposed at one side of said opening and can direct coins to said opening, the improvement which comprises a closure for said opening that is selectively movable to close said opening, a handle for said coin handling device, and a linkage extending between said handle and said closure, said linkage responding to movement of said handle to move said closure toward opening-closing position, said linkage including a yieldable element that can yield and prevent breakage of said linkage if a coin lodges in said opening when said closure uncovers said opening and said closure is thereafter moved toward opening-closing position by said handle and linkage.

23. In a coin handling device that has a reservoir for coins, an opening in said reservoir through which coins can enter said reservoir, a coin passageway that is disposed at one side of said opening and can direct coins to said opening, a closure for said opening that is selectively movable to close said opening, and a feeler that is movable with said closure, said feeler being adjacent said reservoir and having a portion thereof movable into said reservoir to engage coins in said reservoir, said feeler holding said closure against movement to opening uncovering position whenever said portion of said feeler engages a coin within said reservoir, the improvement which comprises a bracket that is adjacent said feeler and has a surface thereon that is adjustable and that engages and supports said reservoir and that is engaged by said feeler, said surface on said bracket being adjustable to position said opening in said reservoir relative to said coin passageway, and to position said feeler and said closure relative to said reservoir and said opening in said reservoir.

24. In a coin-handling device that has a reservoir for coins, an opening in said reservoir, a slide with a coin-receiving opening therein, a second slide with a coin-receiving opening therein, and a coin-supporting surface with a discharge opening therein, the improvement which comprises mounting said slides for reciprocatory movement relative to said reservoir and said coin-supporting surface and relative to each other whereby said coin-receiving openings can receive coins from said opening in said reservoir and can transfer said coins to said discharge opening, and a latch that can be selectively moved into the path of one of said slides to hold said one slide against movement relative to said reservoir and said coin-supporting surface, said latch holding said one slide with the coin-receiving opening thereof in register with said opening in said reservoir, said latch being spaced from the path of the other of said slides to permit movement of said other slide although said one slide is held by said latch.

25. A coin handling device that has a reservoir for coins, an opening in said reservoir through which coins can enter said reservoir, a coin passageway that is disposed at one side of said opening and can direct coins to said opening, a handle, a coin-controlled latch that permits a limited amount of free movement of said handle and that responds to the presence of a coin to free said handle for full movement, a closure for said opening that is selectively movable to close said opening, and a linkage that extends between said handle and said closure whereby movement of said handle can cause movement of said closure, said linkage responding to said limited amount of free movement of said handle to urge said closure to opening uncovering position, whereby said opening can be uncovered before said latch frees said handle for full movement.

26. A coin handling device that has a reservoir for coins, an opening in said reservoir through which coins can enter said reservoir, a coin passageway that is disposed at one side of said opening and can direct coins to said opening, a handle, a coin-controlled latch that permits a limited amount of free movement of said handle and that responds to the presence of a coin to free said handle for full movement, a closure for said opening that is selectively movable to close said opening, a linkage that extends between said handle and said closure whereby movement of said handle can cause movement of said closure, said linkage responding to said limited amount of free movement of said handle to urge said closure to opening uncovering position, whereby said opening can be uncovered before said latch frees said handle for full movement, and an opening leading to said coin passageway to facilitate the manual introduction of coins into said coin passageway and to facilitate the manual introduction of coins into said reservoir whenever said closure is in said opening uncovering position.

27. In a coin handling device that can receive and respond to coins of different denominations and that has a coin carrier with a plurality of coin-receiving recesses therein and a plurality of rotatable levers that can be selectively rotated by coins held in said recesses in said coin carrier, the improvement which comprises openings in said coin carrier through which coins can be introduced into said recesses, openings in said coin carrier through which coins can be discharged from said recesses, said levers being in register with said recesses and being biased to rotate toward said discharge openings and thereby selectively force coins in said recesses toward said discharge openings, and a linkage to move said coin carrier relative to said levers, the movement of said coin carrier rotating said levers away from said discharge openings, thereby increasing the bias on said lever.

28. In a coin handling device that can receive and respond to coins of different denominations and that has a coin carrier with a plurality of coin-receiving recesses therein and a plurality of rotatable levers that can be selectively rotated by coins held in said recesses in said coin carrier, the improvement which comprises openings in said coin carrier through which coins can be introduced into said recesses, openings in said coin carrier through which coins can be discharged from said recesses, and a confining plate that is mounted adjacent said coin carrier and that overlies a portion of at least one of said levers to prevent unlimited rotation of said one lever and that will overlie said coin-introducing openings when said coin carrier moves relative to said levers, said levers being in register with said recesses and selectively engaging coins in said recesses, said confining plate responding to movement of said coin carrier to progressively close said coin-introducing openings and positively hold said coins for engagement with said levers.

29. In a coin handling device that can receive and respond to coins of different denominations and that has a coin carrier with a plurality of coin-receiving recesses therein and a plurality of rotatable levers that can be selectively rotated by coins held in said recesses in said coin carrier, the improvement which comprises openings in said coin carrier through which coins can be introduced into said recesses, openings in said coin carrier through which coins can be discharged from said recesses, and a confining plate that is mounted adjacent said coin carrier and overlies the coin-engaging portions of said levers.

30. In a coin handling device that can receive and respond to coins of different denominations and that has a coin carrier with a plurality of coin-receiving recesses therein, a plurality of levers that can be selectively moved by coins held in said recesses in said coin carrier, a chute for coins that are to be accepted, a chute for coins that are to be returned, openings in said coin carrier through which coins can be introduced into said recesses, openings in said coin carrier through which coins can be discharged from said recesses, a plate that is disposed below said coin carrier, and a linkage that can move said coin carrier relative to said levers and said plate and said chutes, the improvement which comprises mounting said coin carrier for movement between said returned coin chute and said accepted coin chute and mounting said plate for movement relative to said returned coin chute and said accepted coin chute and said coin carrier, said coin carrier having said discharge openings therein initially overlying said returned coin chute, and said plate initially underlying said discharge openings in said coin carrier to support coins in said recesses in said coin carrier, said coin carrier being selectively movable toward said accepted coin chute to move said discharge openings beyond said plate and into register with said accepted coin chute to free coins in said recesses in said coin carrier for movement to said accepted coin chute, said plate being selectively movable toward said accepted coin chute to overlie said accepted coin chute and thereby prevent the movement of returned coins into said accepted coin chute while freeing coins in said recesses in said coin carrier for movement to said returned coin chute.

31. In a coin handling device that can receive and respond to coins of different denominations and that has a coin carrier with a plurality of coin-receiving recesses therein, a plurality of levers that can be selectively moved by coins held in said recesses in said coin carrier, a chute for coins that are to be accepted, a chute for coins that are to be returned, openings in said coin carrier through which coins can be introduced into said recesses, openings in said coin carrier through which coins can be discharged from said recesses, a plate that is disposed below said coin carrier, and a linkage that can move said coin carrier relative to said levers and said plate and said chutes, the improvement which comprises mounting said coin carrier for movement between said returned coin chute and said accepted coin chute and mounting said plate for movement relative to said returned coin chute and said accepted coin chute and said coin carrier, said coin carrier having said discharge openings therein initially overlying said returned coin chute, and said plate initially underlying said discharge openings in said coin carrier to support coins in said recesses in said coin carrier, said coin carrier being selectively movable toward said accepted coin chute to move said discharge openings beyond said plate and into register with said accepted coin chute to free coins in said recesses in said coin carrier for movement to said accepted coin chute, said plate being selectively movable toward said accepted coin chute to overlie said accepted coin chute while freeing coins in said recesses in said coin carrier for movement to said returned coin chute, a linkage that can move said plate relative to said accepted coin chute and said returned coin chute and said coin carrier, and an interlock between said linkages that will prevent simultaneous movement of said coin carrier and said plate into registry with said accepted coin chute.

32. In a coin handling device that has a coin carrier with a coin-receiving recess therein, a lever that can be selectively moved by a coin held in said recess in said coin carrier, a chute for coins that are to be accepted, a chute for coins that are to be returned, an opening in said coin carrier through which coins can be discharged from said recess, a plate that is below said coin carrier, a linkage that can move said coin carrier relative to said lever and said chutes and said plate, and a linkage that can move said plate relative to said coin carrier and said chutes, the improvement which comprises mounting said coin carrier with said discharge opening therein in register with said returned coin chute and mounting said plate between and in register with said discharge opening and said returned coin chute, said plate being selectively movable into registry with said accepted coin chute to block same and thereby prevent the movement of returned coins into said accepted coin chute while uncovering said returned coin chute, said coin carrier being selectively movable to place said discharge opening in register with said accepted coin chute.

33. In a coin handling device that has a coin carrier with a coin-receiving recess therein, a lever that can be selectively moved by a coin held in said recess in said coin carrier, a chute for coins that are to be accepted, a chute for coins that are to be returned, an opening in said coin carrier through which coins can be discharged from said recess, a plate that is below said coin carrier, a linkage that can translate said coin carrier relative to said lever and said chutes and said plate, and a linkage that can translate said plate relative to said coin carrier and said chutes, the improvement which comprises mounting said coin carrier with said discharge opening therein in register with said returned coin chute and mounting said plate between and in register with said discharge opening and said returned coin chute, said plate being selectively translatable into registry with said accepted coin chute to block same and thereby prevent the movement of returned coins into said accepted coin chute while uncovering said returned coin chute, said coin carrier being selectively translatable to place said discharge opening in register with said accepted coin chute, and an interlock between said linkages that limits translation of said coin carrier whenever said plate is translated toward said accepted coin chute and that limits translation of said plate whenever said coin carrier is translated toward said accepted coin chute.

34. In a coin handling device that has a coin carrier with a coin-receiving recess therein, a lever that can be selectively moved by a coin held in said recess in said coin carrier, a chute for coins that are to be accepted, a chute for coins that are to be returned, an opening in said coin carrier through which coins can be discharged from said recess, a plate that is below said coin carrier, a linkage that can translate said coin carrier relative to said lever and said chutes and said plate, and a linkage that can translate said plate relative to said coin carrier and said chutes, the improvement which comprises mounting said coin carrier with said discharge opening therein in register with said returned coin chute and mounting said plate between and in register with said discharge opening and said returned coin chute, said plate being selectively translatable into registry with said accepted coin chute to block same and thereby prevent the movement of returned coins into said accepted coin chute while uncovering said returned coin chute, said coin carrier being selectively translatable to place said discharge opening in register with said accepted coin chute, an interlock between said linkages that limits translation of said coin carrier whenever said plate is translated toward said accepted coin chute and that limits translation of said plate whenever said coin carrier is translated toward said accepted coin chute, and a yieldable element in one of said linkages to prevent the breaking of said linkages in the event of simultaneous actuation of said linkages.

35. In a coin handling device that has a coin carrier with a coin-receiving recess therein, a lever that can be selectively moved by a coin held in said recess in said coin carrier, a chute for coins that are to be accepted, a chute for coins that are to be returned, an opening in said coin carrier through which coins can be discharged from said recess, a plate that is below said coin carrier, a linkage that can translate said coin carrier relative to said lever and said chutes and said plate, and a linkage that can translate said plate relative to said coin carrier and said chutes, the improvement which comprises mounting said coin carrier with said discharge opening therein in register with said returned coin chute and mounting said plate between and in register with said discharge opening and said returned coin chute, said plate being selectively translatable into registry with said accepted coin chute to block same and thereby prevent the movement of returned coins into said accepted coin chute while uncovering said returned coin chute, said coin carrier being selectively translatable to place said discharge opening in register with said accepted coin chute, and an interlock between said linkages that limits translation of said coin carrier whenever said plate is translated toward said accepted coin chute and that limits translation of said plate whenver said coin carrier is translated toward said accepted coin chute, said interlock being at the driving shaft of said coin handling device to relieve said coin carrier and said plate of local stresses and distortion.

36. A coin handling device that can receive and respond to coins of different denominations and that has a coin carrier with a recess for coins of one denomination and with a recess for coins of a different denomination, a handle, a dog that normally limits movement of said handle, a second dog that normally limits movement of said handle, a lever that is registerable with the first said recess in said coin carrier and is movable by a coin therein to move the first said dog to handle-freeing position, a second lever that is registerable with the second said recess in said coin carrier and is movable by a coin therein to move said second dog to handle-freeing position, said levers responding to movement of said coin carrier when a coin of said one denomination is in the first said recess and a coin of said different denomination is in the second said recess to move said dogs and free said handle for movement, and a latch that selectively holds the first said lever and the first said dog in handle-freeing position, whereby said coin handling device can selectively respond to coins of the said different denomination or can respond to coins of said one and said different denominations.

37. In a coin handling device which has a coin carrier with a coin-receiving recess therein, an opening in said coin carrier through which coins can be introduced into said recess, a discharge opening in the bottom of said coin carrier is register with said recess, a platform that is normally disposed below said coin carrier in register with said discharge opening, and a lever that is in register with said recess in said coin carrier, said recess being long and narrow to receive two coins in tandem, said platform serving as the bottom for said recess, said platform having an inclined portion, said inclined portion being in register with the first said opening whenever said coin handling device is at rest and directing the first of said two coins away from first said opening, said lever being engageable by said first coin and being movable by said first coin whenever two coins are in said recess and said coin carrier is moved.

38. In a coin handling device which has a coin carrier with a coin-receiving recess therein, an opening in said coin carrier through which coins can be introduced into said recess, a discharge opening in the bottom of said coin carrier in register with said recess, a platform that is normally disposed below said coin carrier in register with said discharge opening, and a lever that is in register with said recess in said coin carrier, said recess being long and narrow to receive two coins in tandem, said platform serving as the bottom for said recess, said platform having an inclined portion, said inclined portion being in register with the first said opening whenever said coin handling device is at rest and directing the first of said two coins away from said first said opening, said first said opening and said inclined portion of said platform being spaced from said lever, said inclined portion of said platform directing the first said coin toward said lever, and a confining plate that is adjacent said lever and overlies the position for the first said coin, said lever being engageable by said first said coin and being movable by said first coin whenever two coins are in said recess and said coin carrier is moved.

39. In a coin handling device that has a reciprocable coin carrier with a coin receiving recess therein that can receive a plurality of coins in tandem, an opening for the introduction of coins into said recess, a lever that is in register with said recess and can be moved by coins in said recess, a plate that confines coins in said recess as said coin carrier is moved relative to said lever, and an actuator to move said coin carrier, the improvement that comprises a discharge opening in said coin carrier that is spaced from the first said opening but is contiguous with said recess and extends substantially the full length of said recess.

40. In a coin handling device that has a reciprocable coin carrier with a coin receiving recess therein that can receive a plurality of coins in tandem, an opening for the introduction of coins into said recess, a lever that is in register with said recess and can be moved by coins in said recess, an actuator to move said coin carrier, a discharge opening that is contiguous with said recess and extends substantially the full length of said recess, and surfaces on a recess to hold said dummy coin against discharge through said discharge opening.

41. In a coin handling device that has a reciprocable coin carrier with a coin receiving recess therein that can receive a plurality of coins in tandem, an opening for the introduction of coins into said recess, a lever that is in register with said recess and can be moved by coins in said recess, an actuator to move said coin carrier, a discharge opening that is contiguous with said recess and extends substantially the full length of said recess, and surfaces on said recess to hold a dummy coin against discharge through said discharge opening, said surfaces holding said dummy coin adjacent said lever but permitting said dummy coin to move out of lever-actuating position when no other coin is in said recess.

42. In a coin handling device that has a reciprocable coin carrier with a coin receiving recess therein that can receive a plurality of coins in tandem, an opening for the introduction of coins into said recess, a lever that is in register with said recess and can be moved by coins in said recess, an actuator to move said coin carrier, a discharge opening that is contiguous with said recess and extends substantially the full length of said recess, and surfaces on said recess to hold a dummy coin against discharge through said discharge opening, said interacting surfaces constituting a notch in said coin carrier to receive a projecting pin on said dummy coin.

43. A coin handling device that has a coin carrier with a plurality of coin-receiving recesses therein, an opening in said coin carrier through which coins can be introduced into one of said recesses, a second opening in said coin carrier through which coins can be introduced into another of said recesses, said coin carrier being movable through a predetermined path to place said openings in register with or out of register with plurality of coin passageways, an actuator to move said coin carrier, and a coin-raising surface that is adjacent the bottoms of said coin passageways and is closely adjacent the top of said coin carrier and is intermediate the ends of said path, said recesses receiving a predetermined number of coins and having depths equal to integral multiples of the diameter of coins to be held in said recesses plus distances less than one half of the diameters of said coins whereby additional coins resting upon said predetermined number of coins will present upwardly directed portions of their peripheries to said coin-raising surface.

44. A coin handling device that has a coin carrier with a coin-receiving recess therein, an opening in one wall of said carrier through which coins can be introduced into said recess, said coin carrier being movable to selectively place said opening in register with a coin passageway, an actuator to selectively move said coin carrier, and a coin-supporting element that is adjacent said coin passageway and said coin carrier and is registerable with said coin passageway to receive and support coins from said passageway whenever said coin carrier and said opening therein are out of register with said coin passageway, said coin-supporting element being rotatable about a pivot that is spaced above and to one side of said coin carrier, said coin-supporting element having a coin-engaging surface at the approximate level of said wall of said coin carrier whereby coins that are resting upon a coin in said recess are readily transferred to said coin-engaging surface whenever said coin carrier moves out of registry with said coin passageway and whereby coins that are held by said coin-engaging surface can readily be transferred to and supported by said coin carrier whenever said coin carrier returns to registry with said coin passageway.

45. A coin handling device that has a coin carrier disposable in register with or out of register with a coin passageway, an actuator to translate said coin carrier relative to said coin passageway, a returned coin chute below and in register with the discharge outlet of said coin passageway, an accepted coin chute below but out of register with said discharge outlet, a platform that is disposed below the level of said coin carrier but is disposed above the level of said returned coin chute and said accepted coin chute, said platform being translatable into and out of registry with said returned coin chute and said accepted coin chute along a path that is generally parallel to the path of translation of said coin carrier, and an actuator to translate said platform, said coin carrier and said platform normally being disposed between said returned coin chute and said discharge outlet, said coin carrier being translatable relative to said platform to transport coins beyond one edge of platform and thereby permit said coins to move to said accepted coin chute, said platform being translatable relative to said coin carrier to move the opposite edge of said platform out of register with said coin carrier and said returned coin chute and thereby permit coins to move to said returned coin chute, said platform blocking said returned coin chute whenever said coin carrier is translated toward said accepted coin chute, and said platform blocking said accepted coin chute whenever said platform is translated to uncover said returned coin chute.

46. A coin handling device that has a coin carrier with a coin-receiving recess, said coin carrier being movable to place said recess in register with or out of register with a coin passageway, a rotatable lever that is registerable with said recess and is rotatable by a coin in said recess, a coin reservoir, a slide that has a coin-receiving opening and that is reciprocable adjacent said reservoir, a driving lever that normally moves independently of said slide but is selectively connectible to said slide by rotation of the first said lever, said first said lever rotating whenever a coin in said recess is moved against the first said lever by movement of said coin carrier, and an actuator to move said coin carrier and said driving lever.

47. A coin handling device that has a coin carrier with a coin carrier with a coin-receiving recess, said coin carrier being movable to place said recess in register with or out of register with a coin passageway, a rotatable lever that is registerable with said recess and is rotatable by a coin in said recess, a coin reservoir, a slide that has a coin-receiving opening and that is reciprocable adjacent said reservoir, a driving lever that normally moves independently of said slide but is selectively connectible to said slide by rotation of the first said lever, said first said lever rotating whenever a coin in said recess is moved against the first said lever by movement of said coin carrier, an actuator to move said coin carrier, a second recess in said coin carrier, a second slide that has a coin-receiving opening and that is reciprocable adjacent said reservoir, and a third lever that is registerable with said second recess and that is rotatable and that selectively rotates to connect said driving lever to said second slide, said third lever rotating whenever said coin carrier moves a coin in said second recess into engagement with said third lever.

48. In a manually operated coin-handling device that has a reservoir for coins, an opening in said reservoir through which coins can pass from said reservoir, a slide with a coin-receiving opening therein that can receive a predetermined multiple number of coins, a manually operated actuator, a linkage interconnecting said actuator and said slide, and a coin-supporting surface with a discharge opening therein, the improvement which comprises mounting said slide for reciprocatory movement adjacent said opening in said reservoir and mounting said coin-supporting surface adjacent said slide with the centers of said opening in said reservoir and of said discharge opening displaced laterally, said coin-receiving opening in said slide normally being in register with said discharge opening in said coin-supporting surface, said coin-receiving opening in said slide being movable into register with said opening in said reservoir to receive said predetermined multiple number of coins from said reservoir and being movable back to said discharge opening to release said predetermined multiple number of coins, said linkage including a fine ratchet and a ratchet pawl and a trip for said ratchet pawl that frees said ratchet from the holding forces of said ratchet pawl, said ratchet and ratchet pawl being in engagement whenever said coin-receiving opening in said slide is moved toward said opening in said reservoir, said fine ratchet and said ratchet pawl permitting unimpeded movement of said slide as said coin-receiving opening therein is moved toward said opening in said reservoir but preventing appreciable movement of said slide away from said reservoir until after said coin-receiving opening has been placed in registry with said opening in said reservoir, said trip permitting said fine ratchet and ratchet pawl to hold said slide adjacent said reservoir for an appreciable period of time, whereby said predetermined multiple number of coins has time in which to enter said coin-receiving opening in said slide, said linkage actuating said trip to free said ratchet pawl from said ratchet shortly before the end of the cycle of operation of said device.

49. In a coin handling device that has a reservoir for coins, an opening in said reservoir through which coins can pass from said reservoir, a reciprocable slide, with a coin-receiving pocket therein, a coin-receiving surface with a discharge opening therein, and a linkage that selectively moves said coin-receiving pocket in said slide between said opening in said reservoir and said discharge opening during a cycle of operation of said device, the improvement which comprises interacting surfaces in said linkage that normally permit said coin-receiving pocket of said slide to be in register with one of said openings but that respond to the insertion of a predetermined coin to come into engagement to promptly move said coin-receiving pocket of said slide into register with the other of said openings and that thereafter hold said coin-receiving pocket of said slide in register with said other opening throughout the greater part of said cycle of operation of said device, and a trip that releases said interacting surfaces to free said slide to move and to return said coin-receiving pocket into registry with said one opening.

50. In a coin handling device that has a reservoir for coins, an opening in said reservoir through which coins can pass from said reservoir, a reciprocable slide with a coin-receiving pocket therein, a coin-receiving surface with a discharge opening therein, and a linkage that selectively moves said coin-receiving pocket in said slide between said opening in said reservoir and said discharge opening during a cycle of operation of said device, the improvement which comprises interacting surfaces in said linkage that normally permit said coin-receiving pocket of said slide to be in register with one of said openings but that respond to the insertion of a predetermined coin to come into engagement to promptly move said coin-receiving pocket of said slide into register with the other said opening and that thereafter hold said coin-receiving pocket of said slide in register with said other opening throughout the greater part of said cycle of operation of said device, and a trip that releases said interacting surfaces to free said slide to move and to return said coin-receiving pocket into registry with said one opening, said interacting surfaces including a ratchet and a ratchet pawl, said one opening being said discharge opening in said coin-supporting surface, said other opening being said opening in said reservoir.

51. In a coin handling device that has a reservoir for coins, an opening in said reservoir through which coins can pass from said reservoir, a reciprocable slide with a coin-receiving pocket therein, a coin-receiving surface with a discharge opening therein, and a linkage that selectively moves said coin-receiving pocket in said slide between said opening in said reservoir and said discharge opening during a cycle of operation of said device, the improvement which comprises interacting surfaces in said linkage that normally permit said coin-receiving pocket of said slide to be in register with one of said openings but that respond to the insertion of a predetermined coin to come into engagement to promptly move said coin-receiving pocket of said slide into register with the other said opening and that thereafter hold said coin-receiving pocket of said slide in register with said other opening throughout the greater part of said cycle of operation of said device, and a trip that releases said interacting surfaces to free said slide to move and to return said coin-receiving pocket into registry with said one opening, said interacting surfaces coming into engagement before one third of said cycle of operation of said device has been completed, said trip releasing said interacting surfaces after two thirds of said cycle of operation of said device has been completed.

References Cited in the file of this patent

UNITED STATES PATENTS

| | | |
|---|---|---|
| 384,939 | Stollwerck | June 19, 1888 |
| 1,035,348 | Jannell | Aug. 13, 1912 |
| 1,325,766 | Thompson | Dec. 23, 1919 |
| 1,465,409 | Baur | Aug. 21, 1923 |
| 1,764,579 | Peterson | June 17, 1930 |
| 1,802,058 | Lewis | Apr. 21, 1931 |
| 1,910,978 | Allison | May 23, 1933 |

(Other references on following page)

UNITED STATES PATENTS

| | | |
|---|---|---|
| 1,918,154 | Walker | July 11, 1933 |
| 1,938,980 | Silberman | Dec. 12, 1933 |
| 2,185,148 | Evans | Dec. 26, 1939 |
| 2,250,051 | Patzer | July 22, 1941 |
| 2,571,596 | Meredith | Oct. 16, 1951 |
| 2,581,502 | Wallin | Jan. 8, 1952 |
| 2,629,477 | May | Feb. 24, 1953 |
| 2,640,575 | Piano | June 2, 1953 |
| 2,646,153 | Schlanger | July 21, 1953 |
| 2,648,417 | Childers | Aug. 11, 1953 |
| 2,660,284 | York | Nov. 24, 1953 |
| 2,690,828 | Staiger | Oct. 5, 1954 |